US012634949B2

(12) United States Patent
Park et al.

(10) Patent No.: US 12,634,949 B2
(45) Date of Patent: May 19, 2026

(54) METHOD AND DEVICE FOR BEAM MANAGEMENT IN COMMUNICATION SYSTEM

(71) Applicant: Samsung Electronics Co., Ltd., Gyeonggi-do (KR)

(72) Inventors: Kyoungmin Park, Gyeonggi-do (KR); Seongmok Lim, Gyeonggi-do (KR); Youngrok Jang, Gyeonggi-do (KR)

(73) Assignee: Samsung Electronincs Co., Ltd (KR)

( * ) Notice: Subject to any disclaimer, the term of this patent is extended or adjusted under 35 U.S.C. 154(b) by 469 days.

(21) Appl. No.: 18/117,144

(22) Filed: Mar. 3, 2023

(65) Prior Publication Data

US 2023/0292328 A1     Sep. 14, 2023

(30) Foreign Application Priority Data

Mar. 8, 2022    (KR) ........................ 10-2022-0029683

(51) Int. Cl.
*H04W 72/23*        (2023.01)
*H04W 72/12*        (2023.01)
(52) U.S. Cl.
CPC ........... *H04W 72/23* (2023.01); *H04W 72/12* (2013.01)
(58) Field of Classification Search
None
See application file for complete search history.

(56) References Cited

U.S. PATENT DOCUMENTS

2020/0077428 A1\*    3/2020    Zhou .................... H04W 72/23
2021/0051635 A1\*    2/2021    Lo ......................... H04B 7/024

2021/0051667 A1     2/2021    Yang et al.
2021/0136773 A1     5/2021    Yang et al.
2023/0047603 A1     2/2023    Kim et al.
2023/0239885 A1\*    7/2023    Khoshnevisan ...... H04L 5/0044
                                                         370/329
2023/0254815 A1\*    8/2023    Khoshnevisan .... H04W 72/046
                                                         370/329

(Continued)

FOREIGN PATENT DOCUMENTS

WO        WO 2021/162334        8/2021

OTHER PUBLICATIONS

Moderator (Intel Corporation), "Summary#1 of AI: 8.1.2.4 Enhancements on HST-SFN Deployment", R1-2103855, 3GPP TSG RAN WG1 #104b-e, Apr. 12-20, 2021, 32 pages.

(Continued)

*Primary Examiner* — Andrew Lee
(74) *Attorney, Agent, or Firm* — The Farrell Law Firm, P.C.

(57)        ABSTRACT

The disclosure relates to a 5G or 6G communication system for supporting a higher data transmission rate. The disclosure relates to a method performed by a terminal in a communication system, including receiving, in a control resource set (CORESET) among a plurality of CORESETs, a first physical downlink control channel (PDCCH) including first downlink control information (DCI), identifying at least one transmission configuration indication (TCI) state index based on the CORESET and a TCI field included in the first DCI and performing communication based on at least one unified TCI state corresponding to the at least one TCI state index.

16 Claims, 22 Drawing Sheets

1900

(56) References Cited

U.S. PATENT DOCUMENTS

| | | | |
|---|---|---|---|
| 2023/0261848 A1* | 8/2023 | Xu | H04L 5/0048 370/329 |
| 2024/0015719 A1* | 1/2024 | Li | H04L 1/1854 |
| 2024/0223318 A1* | 7/2024 | Yuan | H04W 72/232 |
| 2024/0243881 A1* | 7/2024 | Chung | H04L 5/0053 |
| 2024/0291626 A1* | 8/2024 | Zheng | H04L 5/0094 |
| 2024/0430057 A1* | 12/2024 | Matsumura | H04L 5/005 |
| 2025/0056559 A1* | 2/2025 | Nilsson | H04B 7/022 |
| 2025/0062818 A1* | 2/2025 | Gao | H04L 5/0053 |
| 2025/0106865 A1* | 3/2025 | Gao | H04B 7/06952 |

OTHER PUBLICATIONS

Ericsson, "On Rel-17 FeMIMO", R2-2110341, 3GPP TSG-RAN WG2 #116-e, Nov. 1-12, 2021, 28 pages.
International Search Report dated May 26, 2023 issued in counterpart application No. PCT/KR2023/002958, 7 pages.

* cited by examiner

Figure 14:
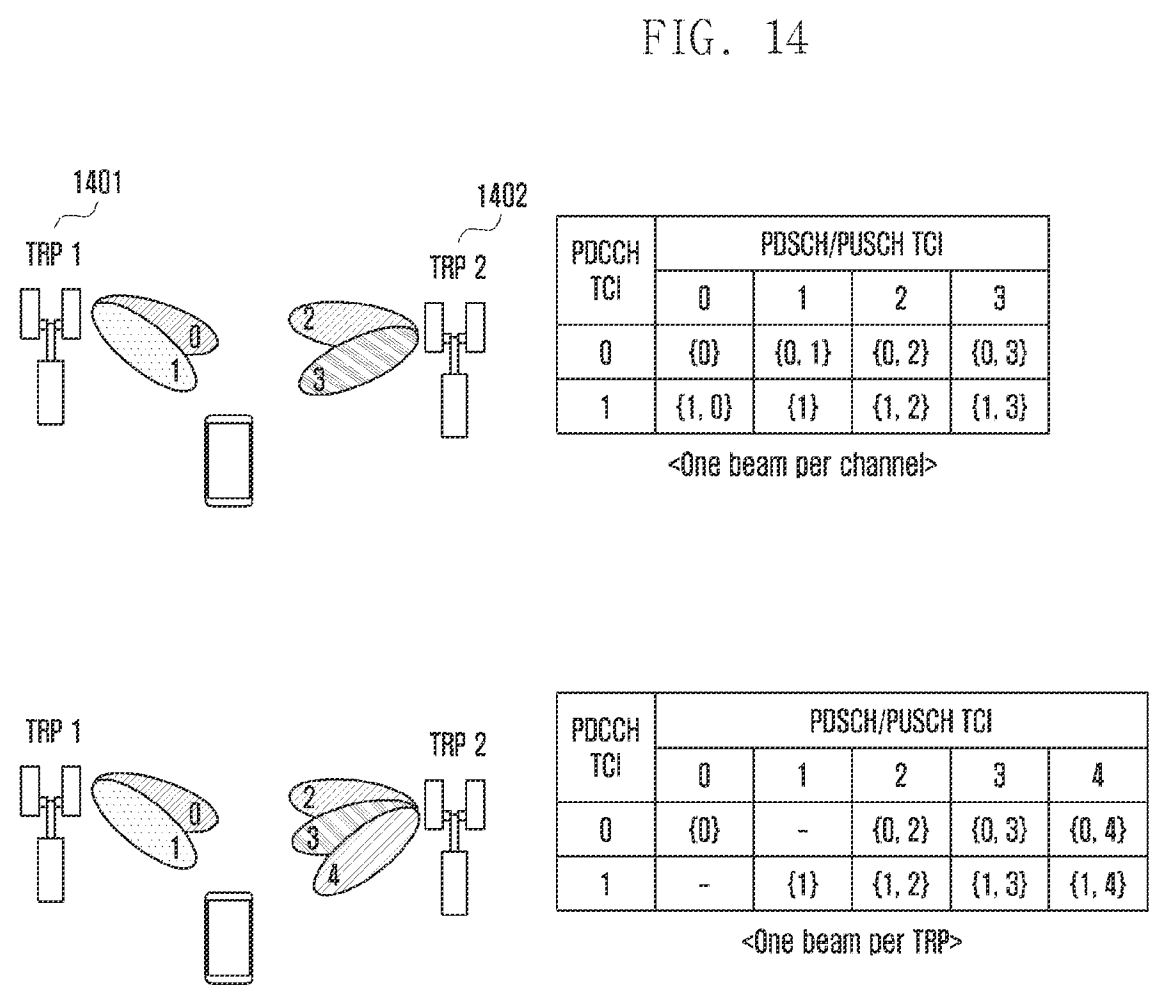

| PDCCH TCI | PDSCH/PUSCH TCI | | | |
|---|---|---|---|---|
| | 0 | 1 | 2 | 3 |
| 0 | {0} | {0,1} | {0,2} | {0,3} |
| 1 | {1,0} | {1} | {1,2} | {1,3} |

<One beam per channel>

| PDCCH TCI | PDSCH/PUSCH TCI | | | | |
|---|---|---|---|---|---|
| | 0 | 1 | 2 | 3 | 4 |
| 0 | {0} | - | {0,2} | {0,3} | {0,4} |
| 1 | - | {1} | {1,2} | {1,3} | {1,4} |

<One beam per TRP>

< First TCI state (TCI state of TRP 1) and
second TCI state (TCI state of TRP 2) indication information>

| TRP field codeword | Via CORESET #1 | Via CORESET #2 | Via CORESET #3 |
|---|---|---|---|
| 0 | {0} | {0, 8} | {2, 6} |
| 1 | {1} | {1, 4} | {2, 7} |
| 2 | {2} | {1, 5} | {2, 8} |
| 3 | {3} | {1, 6} | {3, 4} |
| 4 | {0, 4} | {1, 7} | {3, 5} |
| 5 | {0, 5} | {1, 8} | {3, 6} |
| 6 | {0, 6} | {2, 4} | {3, 7} |
| 7 | {0, 7} | {2, 5} | {3, 8} |

Receive, in CORESET among multiple CORESETs,
PDCCH including DCI                                    ~1901

Identify at least one TCI state index,
based on index of CORESET and TCI field included in DCI    ~1903

Perform communication based on at least one unified
TCI state corresponding to at least one TCI state index    ~1905

2000

Identify TCI field included in DCI and CORESET included in multiple CORESETs — 2001

Transmit, in CORESET, PDCCH including DCI including TCI field — 2003

Perform communication based on at least one unified TCI state corresponding to at least one TCI state index — 2005

2100

2200

METHOD AND DEVICE FOR BEAM MANAGEMENT IN COMMUNICATION SYSTEM

CROSS-REFERENCE TO RELATED APPLICATION(S)

This application is based on and claims priority under 35 U.S.C. § 119 to Korean Patent Application No. 10-2022-0029683, filed on Mar. 8, 2022, in the Korean Intellectual Property Office, the disclosure of which is incorporated herein by reference in its entirety.

BACKGROUND

1. Field

The disclosure relates generally to wireless communication, and more particularly, to beam management operations of a terminal and a base station in a wireless communication system.

2. Description of Related Art

Fifth generation (5G) mobile communication technologies define broad frequency bands such that high transmission rates and new services are possible, and can be implemented not only in sub 6 gigahertz (GHz) bands such as 3.5 GHz, but also in above 6 GHz bands referred to as millimeter wave (mmWave) including 28 GHz and 39 GHz. In addition, it has been considered to implement sixth generation (6G) mobile communication technologies (referred to as beyond 5G systems) in terahertz bands (for example, 95 GHz to 3 terahertz (THz) bands) in order to accomplish transmission rates fifty times faster than 5G mobile communication technologies and ultra-low latencies one-tenth of 5G mobile communication technologies.

Early in 5G mobile communication technology development, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple input multiple output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, layer 2 (L2) pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial Internet of things (IIoT) for supporting new services through interworking and convergence with other industries, Integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

In the conventional art related to physical downlink control channel (PDCCH) beam allocation, it is difficult to indicate a beam change faster than a medium access control-control element (MAC-CE) signaling delay, and flexible PDCCH beam operation is difficult to achieve due to a disadvantage of the same beam being collectively applied to each control resource set (CORESET) regardless of search space characteristics. As such, there is a need in the art for a more flexible PDCCH beam configuration and operation method in order to alleviate this problem of applying the same beam to each CORESET.

Furthermore, while the existing common beam-based beam control technique may reduce the complexity of operation in performing beam control and beam conversion of a base station and a terminal, this is based on an assumption of communication between a single transmission-reception point (TRP) and a terminal, and cannot be applied to an multiple TRP system in which multiple TRPs and a terminal are connected to perform communication. In addition, in the existing common beam control-based beam control technique, beam conversion is performed by beam update via ACK information for a TCI state update indication, which causes a beam control delay. Therefore, there is a need in the art for a common beam-based beam control technique in consideration of multiple TRPs as well as a single TRP.

SUMMARY

The disclosure has been made to address at least the above-mentioned problems and/or disadvantages and to provide at least the advantages described below.

Accordingly, an aspect of the disclosure is to provide a method and a device for beam control (beam management) in a communication system.

Another aspect of the disclosure is to provide a method and device for beam control in a multi-TRP-based system.

An aspect of the disclosure is to provide a method for performing common beam-based beam control by a base station or a TRP with respect to a terminal in a multi-TRP operation mode, and a terminal operation according thereto.

In accordance with an aspect of the disclosure, a method performed by a terminal in a communication system includes receiving, in a control resource set (CORESET) among a plurality of CORESETs, a first physical downlink control channel (PDCCH) including first downlink control information (DCI), identifying at least one transmission configuration indication (TCI) state index based on the CORESET and a TCI field included in the first DCI and performing communication based on at least one unified TCI state corresponding to the at least one TCI state index.

In accordance with an aspect of the disclosure, a terminal in a communication system includes a transceiver, and a controller coupled with the transceiver and configured to receive, in a CORESET among a plurality of CORESETs, a first PDCCH including first DCI, identify at least one TCI state index based on the CORESET and a TCI field included in the first DCI, and perform communication based on at least one common TCI state corresponding to the at least one TCI state index.

In accordance with an aspect of the disclosure, a method performed by a base station in a communication system includes identifying a TCI field included in DCI and a CORESET included in a plurality of CORESETs, wherein the TCI field and the CORESET are related to at least one TCI state index, transmitting, in the CORESET, a first PDCCH including the DCI including the TCI field, and performing communication related to at least one unified TCI state corresponding to the at least one TCI state index.

In accordance with an aspect of the disclosure, a base station in a communication system includes a transceiver, and a controller coupled with the transceiver and configured to identify a TCI field included in DCI and a CORESET included in a plurality of CORESETs, wherein the TCI field and the CORESET are related to at least one TCI state index, transmit, in the CORESET, a first PDCCH including the DCI including the TCI field, and perform communication related to at least one unified TCI state corresponding to the at least one TCI state index.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8 illustrates an antenna port configuration and resource allocation for transmitting a physical downlink shared channel (PDSCH) by using cooperative communication in the communication system to which the disclosure may be applied;

FIG. 10 illustrates when two TCI state values are indicated for m-TRP operation according to an embodiment;

FIG. 11 illustrates when two TCI state values are indicated for m-TRP operation according to an embodiment;

FIG. 14 illustrates a candidate beam for each TRP which can be represented via a 3-bit TCI field according to an embodiment;

FIG. 18 illustrates indicating an update of a common TCI state for each TRP and PDSCH scheduling according to an embodiment;

DETAILED DESCRIPTION

Figure 1:
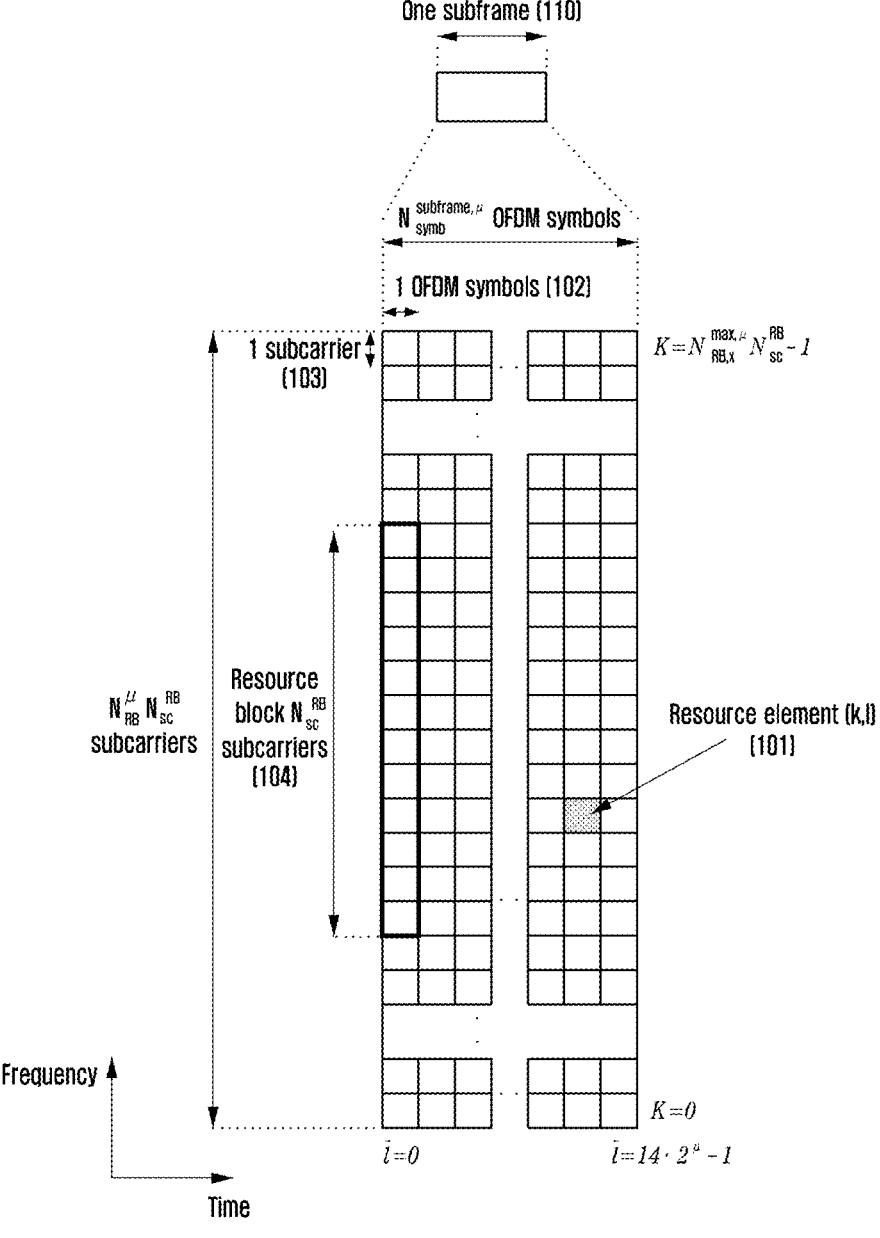
FIG. 1 illustrates a basic structure of a time-frequency domain in a communication system to which the disclosure may be applied.

Hereinafter, embodiments of the disclosure will be described in detail with reference to the accompanying drawings.

In describing embodiments of the disclosure, descriptions related to technical contents well-known in the art and not associated directly with the disclosure will be omitted for the sake of clarity and conciseness.

For the same reason, in the accompanying drawings, some elements may be exaggerated, omitted, or schematically illustrated. The size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a UE, a mobile station (MS), a cellular phone, a smartphone, a computer, or a multimedia system capable of performing communication functions. In the disclosure, a downlink (DL) refers to a radio link via which a base station transmits a signal to a terminal, and an uplink (UL) refers to a radio link via which a terminal transmits a signal to a base station. Herein, long term evolution (LTE) or LTE-A systems may be described by way of example, but the embodiments of the disclosure may also be applied to other communication systems having similar technical backgrounds or channel types. Examples of such communication systems may include 5th generation mobile communication technologies (5G, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

As used in embodiments of the disclosure, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors.

Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card, and the "unit" may include one or more processors.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-advanced (LTE-A), LTE-Pro, high-rate packet data (HRPD) of 3GPP2, ultra-mobile broadband (UMB), IEEE 802.16e, and the like, as well as typical voice-based services.

An LTE system employs an orthogonal frequency division multiplexing (OFDM) scheme in a DL and employs a single carrier frequency division multiple access (SC-FDMA) scheme in a UL. The uplink indicates a radio link through which a UE or a mobile station (MS) transmits data or control signals to a base station (BS) (eNode B), and the downlink indicates a radio link through which the base station transmits data or control signals to the UE. The above multiple access scheme may separate data or control information of respective users by allocating and operating time-frequency resources for transmitting the data or control information for each user so as to avoid overlapping each other and to establish orthogonality.

Since a 5G communication system, which is a post-LTE communication system, must freely reflect various requirements of users, service providers, and the like, services satisfying various requirements must be supported. The services considered in the 5G communication system include eMBB communication, mMTC, URLLC, and the like.

First of all, eMBB aims at providing a data rate higher than that supported by existing LTE, LTE-A, or LTE-Pro. For example, in the 5G communication system, eMBB must provide a peak data rate of 20 gigabits per second (Gbps) in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced MIMO transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the IoT in the 5G communication system. The mMTC has requirements, such as support of connection of a large number of UEs in a cell, enhancement coverage of UEs, improved battery time, and a reduction in the cost of a UE, to effectively provide the IoT. Since the IoT provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time, such as 10 to 15 years, because it is difficult to frequently replace the battery of the UE.

The URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 milliseconds (ms), and also requires a packet error rate of 10-5 or less. Therefore, for the services supporting URLLC, a 5G system must provide a transmit time interval (TTI) shorter than those of other services, and may also require a design for assigning a large number of resources in a frequency band in order to secure reliability of a communication link.

The three services in the 5G communication system, that is, eMBB, URLLC, and mMTC, may be multiplexed and transmitted in a single system. In this case, different transmission/reception techniques and transmission/reception parameters may be used between services in order to satisfy different requirements of the respective services. The 5G is not limited to the above-described three services.

FIG. 1 illustrates a basic structure of a time-frequency domain in a communication system to which the disclosure may be applied.

Referring to FIG. 1, the horizontal axis represents a time domain, and the vertical axis represents a frequency domain. A basic unit of a resource in the time and frequency domains is a resource element (RE) 101 and may be defined to be 1 orthogonal frequency division multiplexing (OFDM) symbol 102 on the time axis and 1 subcarrier 103 on the frequency axis.

$$N_{sc}^{RB}$$

(e.g., 12) consecutive REs in the frequency domain may constitute one resource block (RB) subcarrier 104.

$$N_{symb}^{subframe}$$

consecutive OFDM symbols in the time domain may constitute one subframe 110.

Figure 2:
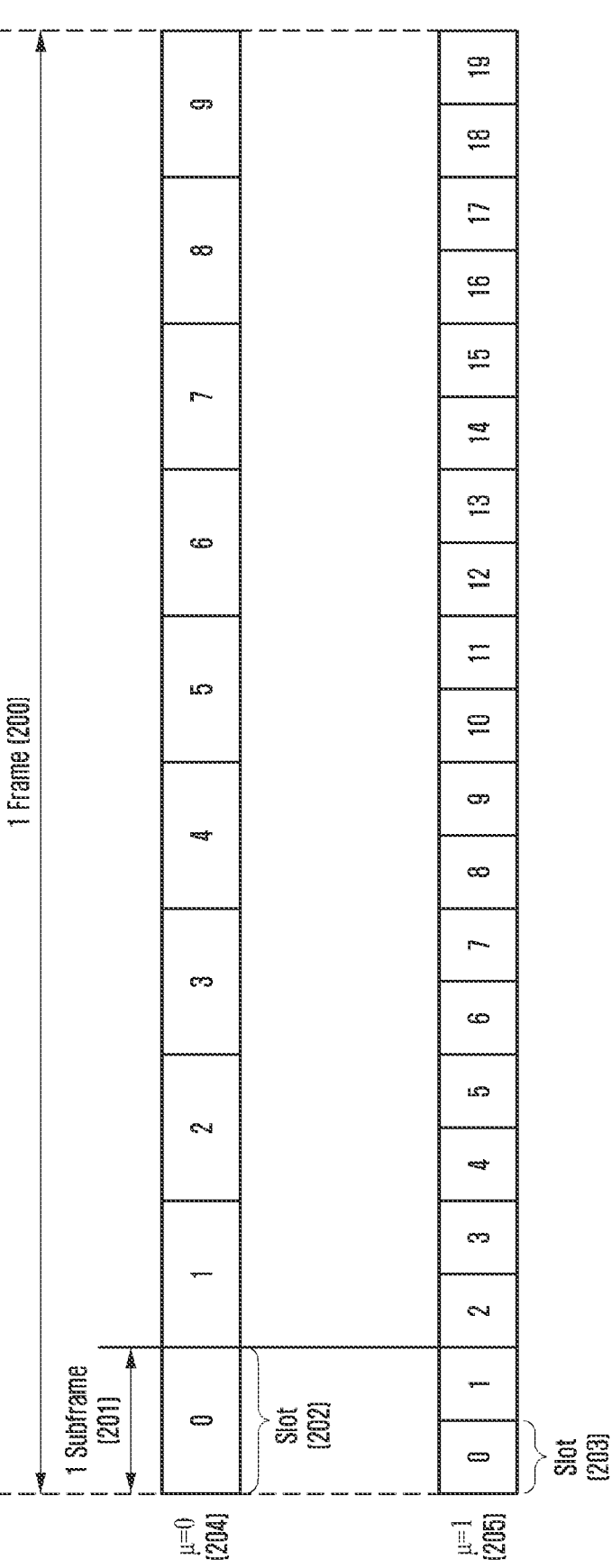
FIG. 2 illustrates frame, subframe, and slot structures in the communication system to which the disclosure may be applied.

FIG. 2 illustrates frame, subframe, and slot structures in the communication system to which the disclosure may be applied.

FIG. 2 illustrates a frame 200, a subframe 201, and a slot 202 structure. One frame 200 may be defined to be 10 ms. One subframe 201 may be defined to be 1 ms, and thus one frame 200 may include a total of 10 subframes 201. One slot 202 or 203 may be defined to be 14 OFDM symbols (that is, the number of symbols per $$\text{slot } (N_{symbol}^{slot}) = 14).$$

One subframe 201 may include one or multiple slots 202 and 203, and the number of slots 202 and 203 per subframe 201 may vary according to configuration values μ 204 and 205 for subcarrier spacings. In FIG. 2, a case where μ=0 204, and a case where μ=1 205 are illustrated as subcarrier spacing configuration values. If μ=0 204, one subframe 201 may include one slot 202, and if μ=1 205, one subframe 201 may include two slots 203. That is, the number $$\left(N_{slot}^{subframe,\mu}\right)$$

of slots per subframe may vary according to configuration value μ for a subcarrier spacing, and accordingly, the number $$\left(N_{slot}^{frame,\mu}\right)$$

of slots per frame may vary.

$$N_{slot}^{subframe,\mu} \text{ and } N_{slot}^{frame,\mu}$$

according to respective subcarrier spacing configurations μ may be defined in Table 1 below.

TABLE 1

| μ | $N_{symbol}^{slot}$ | $N_{slot}^{frame,\,\mu}$ | $N_{slot}^{subframe,\,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Figure 3:
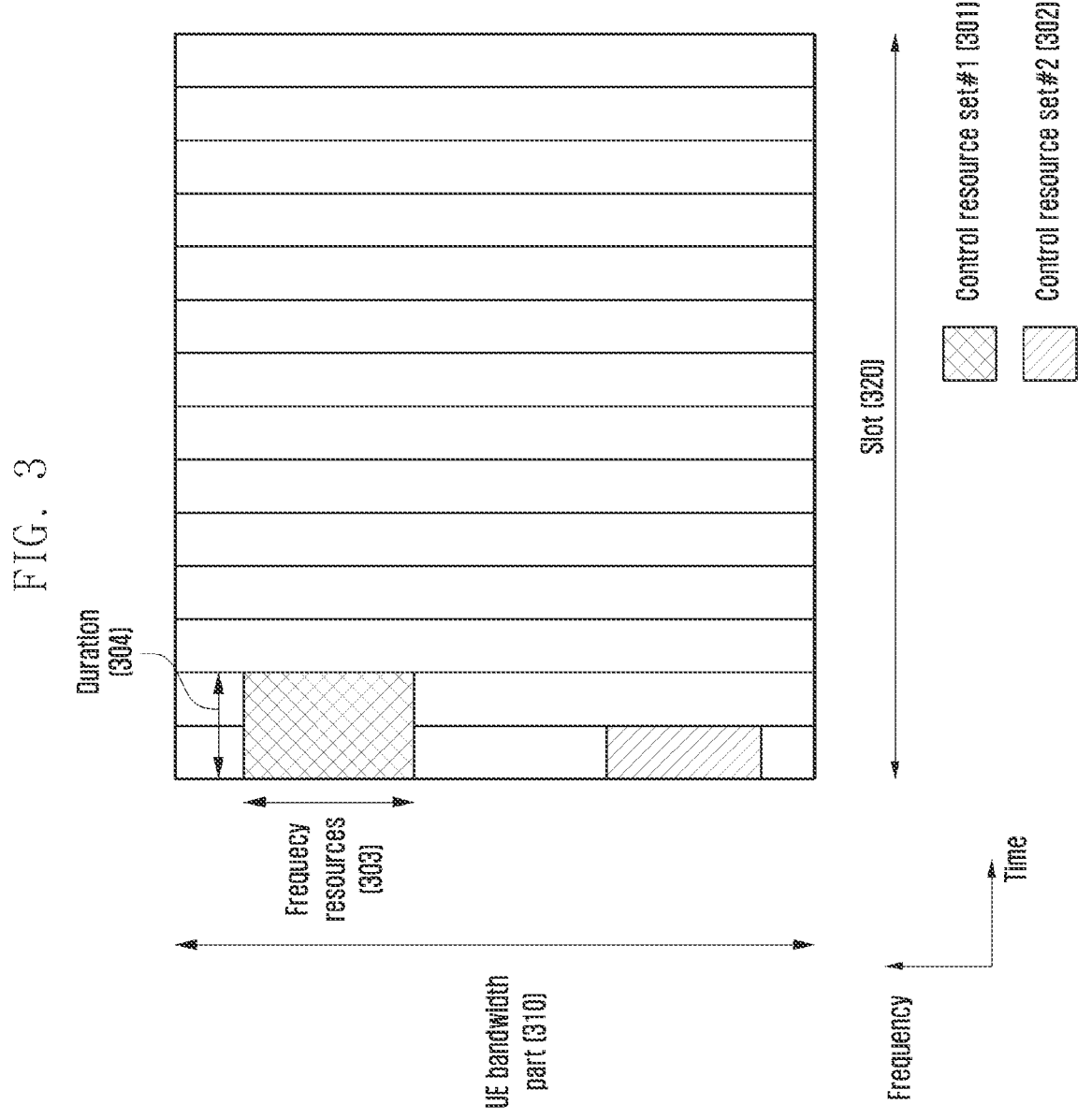
FIG. 3 illustrates a control resource set configuration of a downlink control channel in the communication system to which the disclosure may be applied.

FIG. 3 illustrates a CORESET configuration of a downlink control channel in the communication system (e.g., 5G system) to which the disclosure may be applied.

Referring to FIG. 3, a terminal bandwidth part (UE bandwidth part) 310 is configured on the frequency axis, and two control resource sets (control resource set #1 301 and control resource set #2 302) are configured within one slot 320 on the time axis. The control resource sets 301 and 302 may be configured in a specific frequency resource 303 within the entire terminal bandwidth part 310 on the frequency axis. One or multiple OFDM symbols may be configured on the time axis and may be defined as a control area duration (control resource set duration) 304. As illustrated, control resource set #1 301 is configured to have a control resource set duration of 2 symbols, and control resource set #2 302 is configured to have a control resource set duration of 1 symbol.

The aforementioned control resource set may be configured for the terminal by the base station via higher layer signaling (e.g., system information, a master information block (MIB), and radio resource control (RRC) signaling). Configuring a control resource set for the terminal may refer to providing information, such as an identifier (identity) of the control resource set, a frequency position of the control resource set, and a symbol length of the control resource set. For example, the following information in Table 2 may be included.

TABLE 2

```
ControlResourceSet ::=                    SEQUENCE {
    -- Corresponds to L1 parameter 'CORESET-ID'
    controlResourceSetId            ControlResourceSetId,
    (control resource set identity)
    frequencyDomainResources        BIT STRING (SIZE
(45)),
    (frequency axis resource allocation information)
    duration
    INTEGER (1..maxCoReSetDuration),
    (time axis resource allocation information)
    cce-REG-MappingType
    CHOICE {
    (CCE-to-REG mapping scheme)
        interleaved
        SEQUENCE {
            reg-BundleSize
        ENUMERATED {n2, n3, n6},
        (REG bundle size)
            precoderGranularity
        ENUMERATED {sameAsREG-bundle, allContiguousRBs},
            interleaverSize
        ENUMERATED {n2, n3, n6}
            (interleaver size)
            shiftIndex
        INTEGER(0..maxNrofPhysicalResourceBlocks-1)
                                        OPTIONAL
        (interleaver shift)
    },
    nonInterleaved                  NULL
    },
    tci-StatesPDCCH
    SEQUENCE(SIZE (1..maxNrofTCI-StatesPDCCH)) OF TCI-StateId
        OPTIONAL,
    (QCL configuration information)
    tci-PresentInDCI
    ENUMERATED {enabled}
                                    OPTIONAL,  --
Need S
}
```

In Table 2, tci-StatesPDCCH (referred to as a transmission configuration indication (TCI) state) configuration information may include information on one or multiple synchronization signal (SS)/physical broadcast channel (PBCH) block indices or channel state information reference signal (CSI-RS) indices having the quasi co-location (QCL) relationship with a demodulation reference signal (DMRS) transmitted in the corresponding control resource set.

Figure 4:
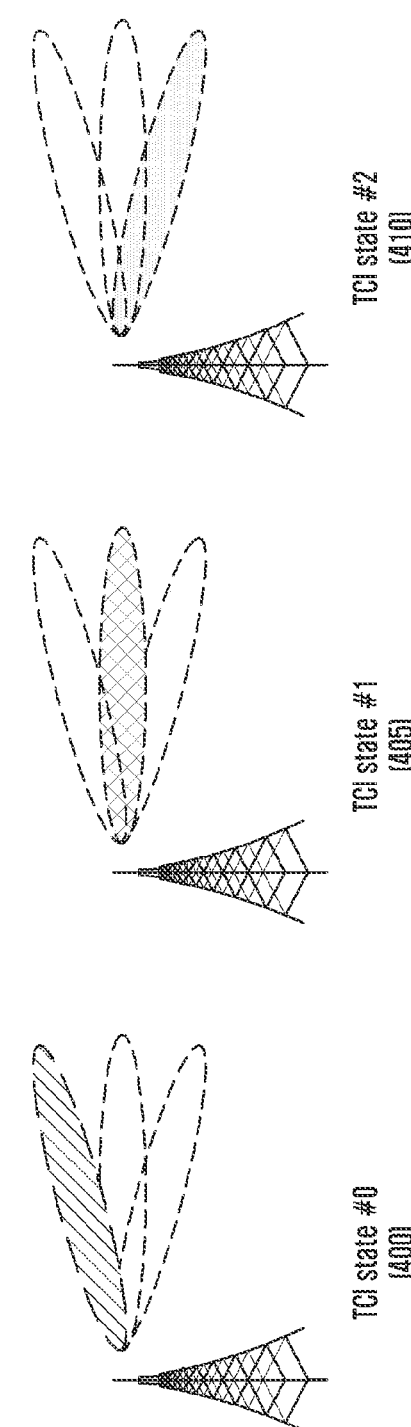
FIG. 4 illustrates base station beam allocation according to a TCI state configuration in the communication system to which the disclosure may be applied.

FIG. 4 illustrates base station beam allocation according to a TCI state configuration in the communication system to which the disclosure may be applied.

Referring to FIG. 4, a base station may transfer information on N different beams to a terminal via N different TCI states. For example, when N=3 as shown in FIG. 4, the base station may cause qcl-Type2 parameters, which are included in three TCI states 400, 405, and 410, to be associated with CSI-RSs or SSBs corresponding to different beams and to be configured to QCL type D, so as to announce that antenna ports referring to the different TCI states 400, 405, and 410 are associated with different spatial Rx parameters that are different beams.

Figure 5:
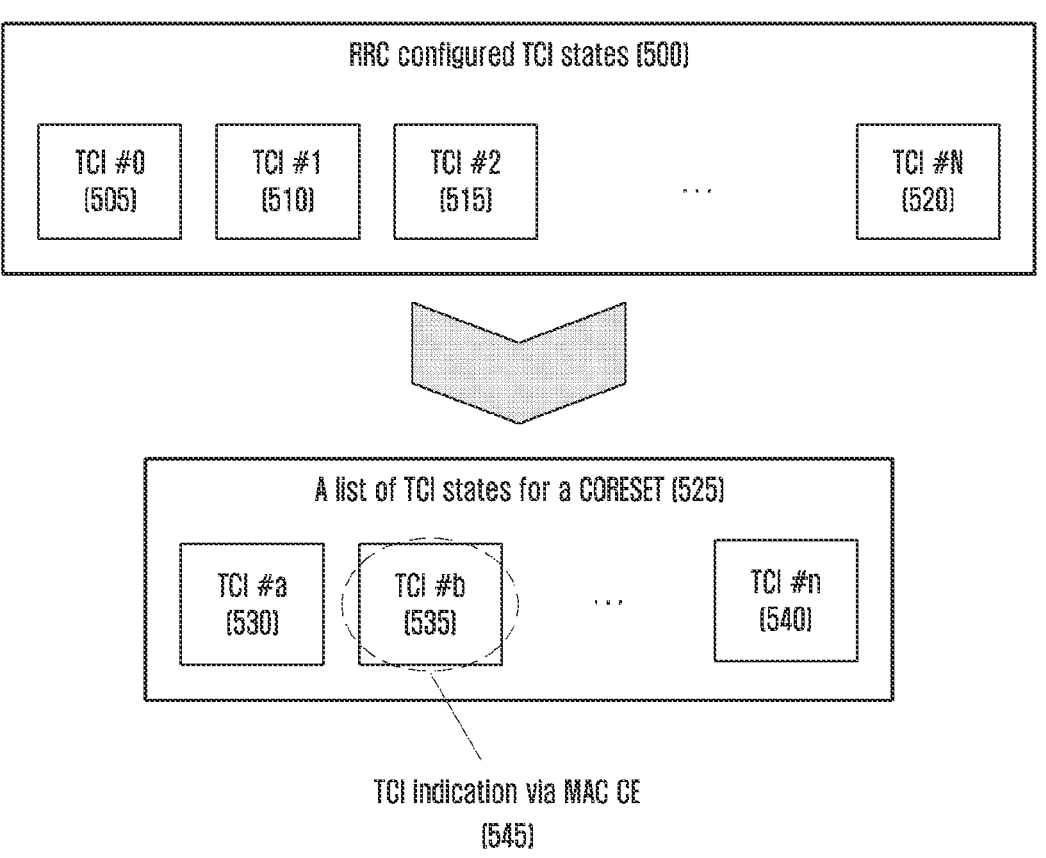
FIG. 5 illustrates a method of TCI state allocation for a PDCCH in the communication system to which the disclosure may be applied.

FIG. 5 illustrates a method of TCI state allocation for a PDCCH in the communication system to which the disclosure may be applied.

The communication system (e.g., a 5G system) to which the disclosure may be applied supports, for dynamic allocation of PDCCH beams, a hierarchical signaling method as illustrated in FIG. 4.

Referring to FIG. 5, a base station may configure N TCI states 505, 510, . . . , 520 for a terminal via RRC signaling 500, and some of the TCI states may be configured 525 as TCI states for a CORESET. The base station may then indicate 545 one of the TCI states 530, 535, and 540 for a CORESET to the terminal via MAC CE signaling. Thereafter, the terminal receives a PDCCH, based on beam information included in the TCI states indicated by the MAC CE signaling.

Figure 6:
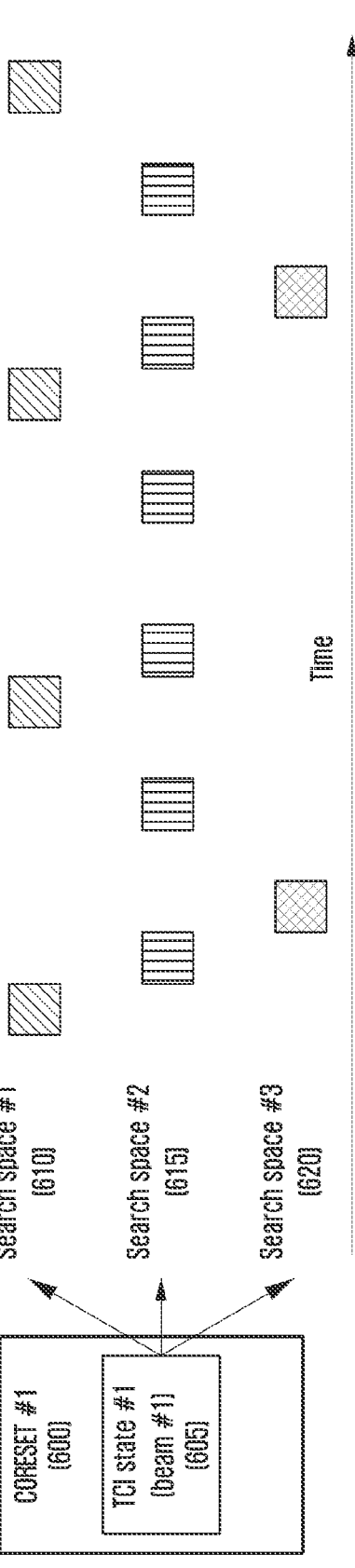
FIG. 6 illustrates beam configuration of a CORESET and a search space in the communication system to which the disclosure may be applied.

FIG. 6 illustrates beam configuration of a CORESET and a search space in the communication system to which the disclosure may be applied.

Referring to FIG. 6, a base station may indicate one (TCI state #1) 605 in a TCI state list included in a configuration for a CORESET (CORESET #1) 600 via MAC CE signaling. Until another TCI state is indicated to a corresponding CORESET via another MAC CE signaling, a terminal considers that the same QCL information (beam #1) is applied to all of one or more search spaces 610, 615, and 620 connected to the CORESET 600.

As previously noted, in this PDCCH beam allocation method, it is difficult to indicate a beam change faster than a MAC CE signaling delay, and flexible PDCCH beam operation is difficult to achieve due to a disadvantage of the same beam being collectively applied to each CORESET regardless of search space characteristics. As such, the disclosure provides a more flexible PDCCH beam configuration and operation method.

Specifically, the base station may configure one or multiple TCI states for the terminal with respect to a specific CORESET, and may activate one of the configured TCI states via a MAC CE activation command. For example, TCI state #0, TCI state #1, TCI state #2 may be configured as TCI states for CORESET #1, and the base station may transmit, to the terminal via the MAC CE, a command for activation so that TCI state #0 is assumed to be a TCI state for CORESET #1. Based on the activation command for the TCI state, which has been received via the MAC CE, the terminal may correctly receive a DMRS of the corresponding CORESET, based on QCL information within the activated TCI state.

For a CORESET (CORESET #0) having an index configured to be 0, if the terminal has failed to receive a MAC CE activation command for a TCI state of CORESET #0, the terminal may assume that a DMRS transmitted in CORESET #0 has been quasi co-located with an SS/PBCH block identified during initial access or non-contention-based random access that is not triggered by a PDCCH command.

For a CORESET #X having an index configured to be a value other than 0, if the terminal has failed to be configured with a TCI state for CORESET #X, or has been configured with one or more TCI states but has failed to receive a MAC CE activation command to activate one of the TCI states, the terminal may assume that a DMRS transmitted in CORESET #X has been quasi co-located with an SS/PBCH block identified during initial access.

Figure 7:
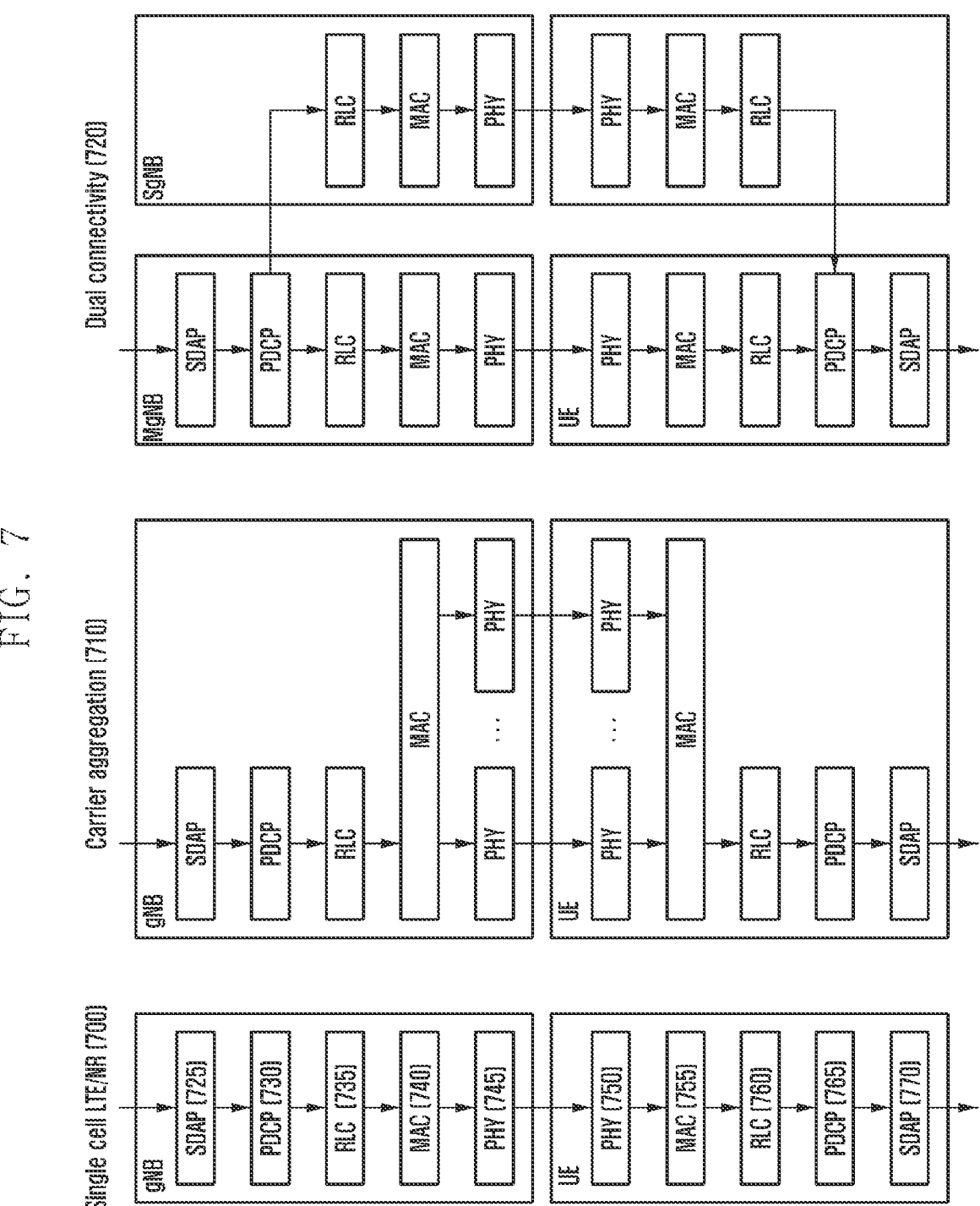
FIG. 7 illustrates radio protocol structures of a base station and a terminal in cases of a single cell, carrier aggregation, and dual connectivity in the communication system to which the disclosure may be applied.

FIG. 7 illustrates radio protocol structures of a base station and a terminal in cases of a single cell, carrier aggregation, and dual connectivity in the communication system to which the disclosure may be applied.

Referring to FIG. 7, radio protocols of the communication system may include NR service data adaptation protocols (SDAPs) 725 and 770, NR packet data convergence protocols (PDCPs) 730 and 765, NR radio link controls (RLCs) 735 and 760, and NR MACs 740 and 755 in both a terminal (UE) and an NR base station (gNB), respectively.

Main functions of the NR SDAPs 725 and 770 may include at least one of a data transfer function (transfer of user plane data), a mapping function of a quality of service (QoS) flow and a data bearer for an uplink and a downlink (mapping between a QoS flow and a data radio bearer (DRB)

for both DL and UL), a marking function of a QoS flow identifier (ID) in an uplink and a downlink (marking QoS flow ID in both DL and UL packets), and a mapping function of a reflective QoS flow to a data bearer for uplink SDAP PDUs (reflective QoS flow to DRB mapping for the UL SDAP PDUs)

With respect to an SDAP layer device, the terminal may be configured, via an RRC message, whether to use a header of the SDAP layer device or whether to use a function of the SDAP layer device for each PDCP layer device, for each bearer, or for each logical channel, and if the SDAP header is configured, a non-access stratum (NAS) QoS reflection configuration 1-bit indicator (NAS reflective QoS) and an AS QoS reflection configuration 1-bit indicator (AS reflective QoS) in the SDAP header may indicate the terminal to update or reconfigure mapping information for data bearers and QoS flows in uplink and downlink. The SDAP header may include QoS flow ID information indicating QoS. The QoS information may be used as a data processing priority, scheduling information, etc. to support a smooth service operation.

Main functions of the NR SDAPs 730 and 765 may include at least one of a header compression and decompression function (ROHC only), a user data transmission function (transfer of user data), an in-sequence delivery function (in-sequence delivery of upper layer PDUs), an out-of-sequence delivery function (out-of-sequence delivery of upper layer PDUs), a reordering function (PDCP PDU reordering for reception), a duplicate detection function (duplicate detection of lower layer SDUs), a retransmission function (retransmission of PDCP SDUs), an encryption and decryption function (ciphering and deciphering), and a timer-based SDU discard function (timer-based SDU discard in uplink).

The reordering function of the NR PDCP device refers to a function of reordering PDCP PDUs received from a lower layer in order based on a PDCP sequence number (SN), and may include a function of transferring data to a higher layer according to the reordered sequence. Alternatively, the reordering function of the NR PDCP device may include a function of direct transfer without considering a sequence, may include a function of reordering the sequence to record lost PDCP PDUs, may include a function of reporting states of the lost PDCP PDUs to a transmission side, and may include a function of requesting retransmission of the lost PDCP PDUs.

Main functions of the NR SDAPs 735 and 760 may include at least one of a data transmission function (transfer of upper layer PDUs), in-sequence delivery function (in-sequence delivery of upper layer PDUs), an out-of-sequence delivery function (out-of-sequence delivery of upper layer PDUs), automatic repeat request (ARQ) function (error correction through ARQ), a concatenation, segmentation, and reassembly function (concatenation, segmentation and reassembly of RLC SDUs), a re-segmentation function (re-segmentation of RLC data PDUs), a reordering function (reordering of RLC data PDUs), a duplicate detection function (duplicate detection), an error detection function (protocol error detection), an RLC SDU discard function, and an RLC re-establishment function.

The in-sequence delivery function of the NR RLC device may refer to a function of sequentially delivering, to a higher layer, RLC SDUs received from a lower layer and may include a function of, if originally one RLC SDU is segmented into multiple RLC SDUs and then received, reassembling and delivering the same, reordering the received RLC PDUs according to an RLC SN or a PDCP SN, reordering a sequence and recording lost RLC PDUs, reporting states of the lost RLC PDUs to a transmission side, and requesting retransmission of the lost RLC PDUs.

The in-sequence delivery function may further include at least one of a function of, if there is a lost RLC SDU, sequentially delivering only RLC SDUs before the lost RLC SDU to a higher layer, sequentially delivering all the received RLC SDUs to a higher layer before a predetermined timer starts if the timer expires even if there is a lost RLC SDU, or sequentially delivering all the RLC SDUs received up to the current time to a higher layer if the predetermined timer expires even if there is a lost RLC SDU.

In addition, the RLC PDUs may be processed in order of arrival regardless of the order of the sequence numbers or serial numbers and may be delivered to a PDCP device regardless of out-of-sequence delivery.

In the case of segments, segments stored in a buffer or to be received at a later time may be received, reconfigured into one complete RLC PDU, processed, and then may be delivered to the PDCP device. The NR RLC layer may not include a concatenation function, and the function may be performed in an NR MAC layer or may be replaced with a multiplexing function of the NR MAC layer.

In the above, the out-of-sequence delivery function of the NR RLC device refers to a function of delivering RLC PDUs received from a lower layer to an immediate higher layer in any order, and may include a function of, when originally one RLC SDU is divided into multiple RLC SDUs and then received, reassembling the divided RLC SDUs and delivering the same, and storing RLC SNs or PDCP SNs of the received RLC PDUs, arranging the order thereof, and recording lost RLC PDUs.

The NR MAC 740 or 755 may be connected to multiple NR RLC layer devices included in one terminal, and main functions of the NR MAC may include a mapping function (mapping between logical channels and transport channels), a multiplexing and demultiplexing function (multiplexing/demultiplexing of MAC SDUs), a scheduling information reporting function, a hybrid automatic repeat request (HARQ) function (error correction through HARQ), a priority handling function between logical channels (priority handling between logical channels of one UE), a priority handling function between terminals (priority handling between UEs by means of dynamic scheduling), an MBMS service identification function, a transport format selection function, and a padding function.

The NR PHY layers 745 and 750 may perform channel coding and modulation of higher layer data, make the channel coded and modulated higher layer data into OFDM symbols, and transmit the OFDM symbols via a radio channel, or may perform demodulation and channel-decoding of the OFDM symbols received via the radio channel so as to transfer the same to a higher layer.

The detailed structure of the radio protocol structure may be variously changed according to a carrier (or cell) operation method. For example, if the base station transmits data to the terminal based on a single carrier (or cell), the base station and the terminal use a protocol structure having a single structure for each layer, as shown in 700. If the base station transmits data to the terminal, based on carrier aggregation (CA) using multiple carriers in a single TRP, the base station and the terminal use a protocol structure in which up to the RLC has a single structure but the PHY layer is multiplexed via the MAC layer, as in 710. Alternatively, if the base station transmits data to the terminal, based on dual connectivity (DC) using multiple carriers in multiple TRPs, the base station and the terminal use a protocol structure in which up to the RLC has a single structure but the PHY layer is multiplexed via the MAC layer, as in 720.

The system to which the disclosure may be applied may support not only a service requiring a high transmission rate, but also a service having a very short transmission delay and a service requiring a high connection density. In a wireless communication network including multiple cells, TRPs, or beams, cooperative communication (coordinated transmission) between the respective cells, TRPs, or/and beams may satisfy various service requirements by enhancing the strength of a signal received by a terminal or efficiently performing interference control between the respective cells, TRPs, or/and beams.

Joint transmission (JT) is a representative transmission technique for the aforementioned cooperative communication, and is a technique for increasing the strength or throughput of a signal received by a terminal, by transmitting the signal to one terminal via multiple different cells, TRPs, and/or beams. In this case, channels between the terminal and the respective cells, TRPs, and/or beams may have significantly different characteristics, and in particular, non-coherent joint transmission (NC-JT) supporting non-coherent precoding between the respective cells, TRPs, and/or beams may require individual precoding, MCS, resource allocation, TCI indication, etc. according to a channel characteristic for each link between the terminal and the respective cells, TRPs, and/or beams.

The aforementioned NC-JT transmission may be applied to at least one of a PDSCH, a PDCCH, a physical uplink shared channel (PUSCH), and a physical uplink control channel (PUCCH). During PDSCH transmission, transmission information, such as precoding, MCS, resource allocation, and TCI, is indicated via DL DCI, and for NC-JT transmission, the transmission information should be independently indicated for each cell, TRP, and/or beam. This becomes a major factor in increasing a payload required for DL DCI transmission, which may adversely affect reception performance of a PDCCH which transmits DCI. Therefore, in order to support JT of a PDSCH, it is necessary to carefully design tradeoff between the amount of DCI information and control information reception performance.

Figure 8:
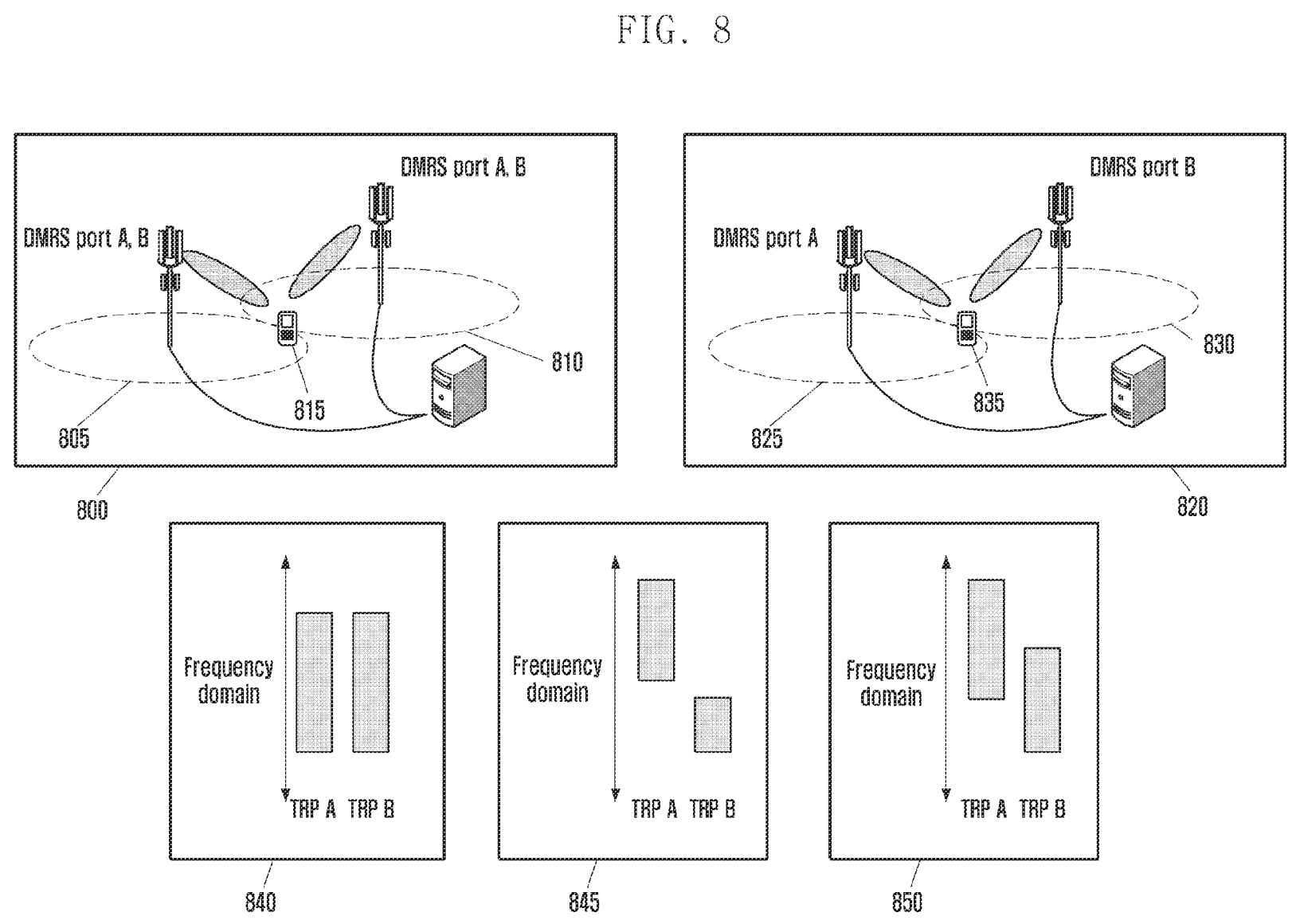

FIG. 8 illustrates an antenna port configuration and resource allocation for transmitting a PDSCH by using cooperative communication in the communication system to which the disclosure may be applied.

Example 800 illustrates coherent joint transmission (C-JT) supporting coherent precoding between respective cells, TRPs or/and beams.

For C-JT, TRP A 805 and TRP B 810 transmit a piece of data (PDSCH) to a terminal 815, and joint precoding may be performed in multiple TRPs. This may indicate that DMRSs are transmitted through identical DMRS ports in order for TRP A 805 and TRP B 810 to transmit the same PDSCH. For example, TRP A 805 and TRP B 810 may transmit DMRSs to the terminal through DMRS port A and DMRS, respectively. In this case, the terminal may receive one piece of DCI information for reception of one PDSCH demodulated based on the DMRSs transmitted through DMRS port A and DMRS port B.

Example 820 illustrates NC-JT that supports non-coherent precoding between respective cells, TRPs, and/or beams for PDSCH transmission.

For NC-JT, a PDSCH is transmitted to a terminal 835 via each of cells, TRPs 825 and 830, and/or beams, and individual precoding may be applied to each PDSCH. Each cell, TRP, and/or beam transmits a different PDSCH or a different PDSCH layer to the terminal, thereby improving a throughput compared to single cell, TRP, and/or beam transmission. Each cell, TRP, and/or beam repeatedly transmits the same PDSCH to the terminal, thereby improving reliability compared to single cell, TRP and/or beam transmission. Hereinafter, for convenience of description, a cell, a TRP, and/or a beam is collectively referred to as a TRP.

In this case, various radio resource allocations may be considered as shown in example 840 where all frequency and time resources used for PDSCH transmission in multiple TRPs are the same, example 845 where the frequency and time resources used in multiple TRPs do not overlap at all, and example 850 where some of the frequency and time resources used in multiple TRPs overlap.

In order to concurrently assign multiple PDSCHs to one terminal for NC-JT support, DCI of various types, structures, and relationships may be considered.

Herein, "cooperative TRP" may be replaced with various terms, such as "cooperative panel" or "cooperative beam" when actually applied.

Herein, "when NC-JT is applied" can be interpreted in various ways according to situations, such as "when a terminal receives one or more PDSCHs concurrently in one BWP", "when a terminal receives PDSCHs, based on two or more transmission configuration indicator (TCI) indications concurrently in one BWP", and "when PDSCHs received by a terminal is associated with one or more DMRS port groups", but one expression is used for convenience of description.

Herein, the radio protocol structure for NC-JT may be used in various manners according to a TRP deployment scenario. For example, if there is no backhaul delay or a small backhaul delay between cooperative TRPs, a method (CA-like method) using a structure based on MAC layer multiplexing similar to reference numeral 710 of FIG. 7 is possible. However, if a backhaul delay between cooperative TRPs is so large that the backhaul delay cannot be disregarded (e.g., when at least 2 ms is required for information exchange such as CSI, scheduling, HARQ-ACK, etc. between cooperative TRPs), a DC-like method for securing characteristics robust to a delay by using an independent structure for each TRP from the RLC layer is possible, similar to reference numeral 720 of FIG. 7.

In the aforementioned multi-TRP system, a TRP may be distinguished by a CORESET or a reference signal (RS) resource index. For example, CORESETPoolIndex which is a higher index may be configured for each CORESET, and in this case, a TRP for transmission of a PDCCH in a corresponding CORESET in CORESETPoolIndex may be distinguished. That is, in a set of CORESETs having the same CORESETPoolIndex, it may be assumed that the same TRP transmits a PDCCH or that the same TRP transmits a PDCCH for scheduling of a PDSCH. For a CORESET in which CORESETPoolIndex is not configured, it may be assumed that a default value (e.g., 0) of CORESETPoolIndex has been configured. Alternatively, for example, a sounding reference signal (SRS) resource set is configured for each TRP, and each of two SRS resource indicator (SRI) fields within DCI may indicate an SRS resource of the SRS resource set. That is, a first SRI field may indicate an SRS resource in an SRS resource set configured for a first TRP, and a second SRI field may indicate an SRS resource in an SRS resource set configured for a second TRP. By transmitting a PUSCH associated with an RS resource index, that is, an SRS resource indicated by an SRI field for each SRS resource set, the terminal may transmit the PUSCH by distinguishing TRPs.

In the communication system to which the disclosure may be applied, a multiple transmission and reception point (hereinafter, m-TRP) technique of performing communication by a terminal via multiple transmission/reception nodes has been set forth as a technique that can satisfy conflicting requirements of a URLLC service requiring high reliability and an eMBB service requiring a high transmission rate. In addition, a method of transmitting or receiving various channels, such as a PDCCH, a PDSCH, a PUCCH, and a PUSCH, via multiple transmitting/receiving nodes has also been set forth. The described m-TRP technique may be divided into a single-DCI (hereinafter, s-DCI) technique for controlling transmission or reception via multiple nodes according to one piece of control information, and a multiple-DCI (hereinafter, m-DCI) technique for separately transmitting information on respective nodes. The s-DCI technique is suitable for use in a network having a relatively simple structure in which only one node among multiple nodes performs terminal control, or in a cell or a base station responsible for communication in a small area, whereas the m-DCI technique may be considered for use in a network having a structure in which multiple nodes perform terminal control, or a network which provides a communication service in a relatively wide area and has a long distance between respective nodes.

In addition, a multi-panel-based communication technique has been set forth as a communication technique of a terminal, which corresponds to the described m-TRP technique. The multi-panel-based communication technique is for performing communication by a terminal via multiple antenna arrays which are independently available, wherein the multi-panel-based communication technique is capable of increasing a total transmission power via an independent operation for each array and a cooperative operation between respective arrays, and may enable communication via a beam having an excellent quality.

In addition, use of a common beam has been set forth as a method for reducing a burden of transmission or reception of control information used for beam control and reducing overall complexity by simplifying operations of a terminal and a base station.

In the disclosure, a common beam may operate in a manner of designating a common TCI state. In order to use a common beam, a base station may deliver common beam-related beam control information to a terminal by indicating, to the terminal, a TCI state index associated with a beam commonly used for transmission or reception of one or multiple channels or signals. The terminal may acquire a TCI state index from the received beam control information, and may identify whether the acquired TCI state is the same as a common TCI state stored in the terminal. If the TCI states are different, the terminal may change (update) the common TCI state to the acquired TCI state, and transmit ACK information to the base station so as to inform the base station of successful reception of the TCI state indication. In this manner, the changed common TCI state may be applied to subsequent transmission or reception of channels and signals.

Figure 9:
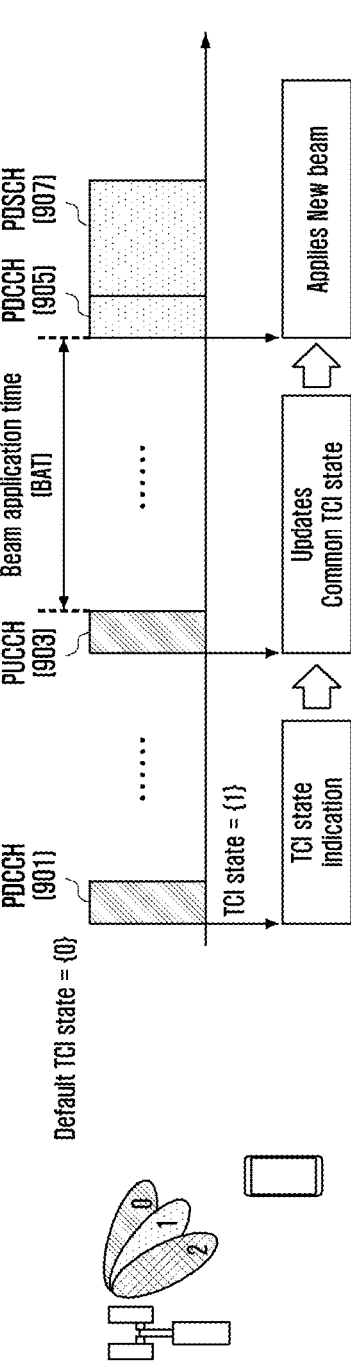
FIG. 9 illustrates a common beam-based beam control method according to an embodiment.

FIG. 9 illustrates a common beam-based beam control method according to an embodiment.

Specifically, FIG. 9 illustrates applying a common TCI state when transmission/reception beams of a PDCCH, a PDSCH, a PUCCH, and/or a PUSCH are controlled by a designated common TCI state.

In FIG. 9, it is assumed that a base station configures, for a terminal, candidate beams corresponding to three TCI states, such as {0, 1, 2}, and a beam corresponding to TCI state 0 is configured as an initial use beam. The assumption has been made for convenience of description, and the disclosure is not limited to the example of FIG. 9. The base station may transmit DCI indicating {1}, which is a new TCI state x, via a PDCCH 901. For example, basic TCI state={0} may be applied to transmission of control information. The terminal may identify the control information received from the base station, update a common TCI state with TCI state={1}, and report acknowledgement (ACK) information, which indicates that a transmission/reception beam has been changed to a beam corresponding to TCI state={1}, to the base station via a PUCCH 903. After a beam application time (BAT), the terminal and the base station may transmit or receive a PDCCH 905, a PDSCH 907, a PUCCH, and/or a PUSCH via a new beam (i.e., a beam corresponding to the changed common TCI state={1}).

If the terminal performs communication with a single TRP, according to the common beam-based communication technique in which the base station supports terminal beam control, the complexity of beam control and beam formation can be reduced by using a single beam in the base station and the terminal, and the amount of beam control information can also be reduced. In addition, since a beam control of a control channel specified by a PDCCH is performed via dynamic control information (e.g., downlink control information) delivered via the PDCCH, beam reliability of the control channel can also be secured even in an environment where channels are changed rapidly.

For an m-TRP system in which a terminal communicates with multiple TRPs, there is difficulty in applying the described common beam-based communication technique. Specifically, when a terminal performs communication via multiple transmission/reception nodes, communication between the terminal and respective nodes is performed via respective different beams, and the base station delivers beam information for each TRP or information on multiple beams to the terminal in the form of information on multiple TCI states.

Figure 10:
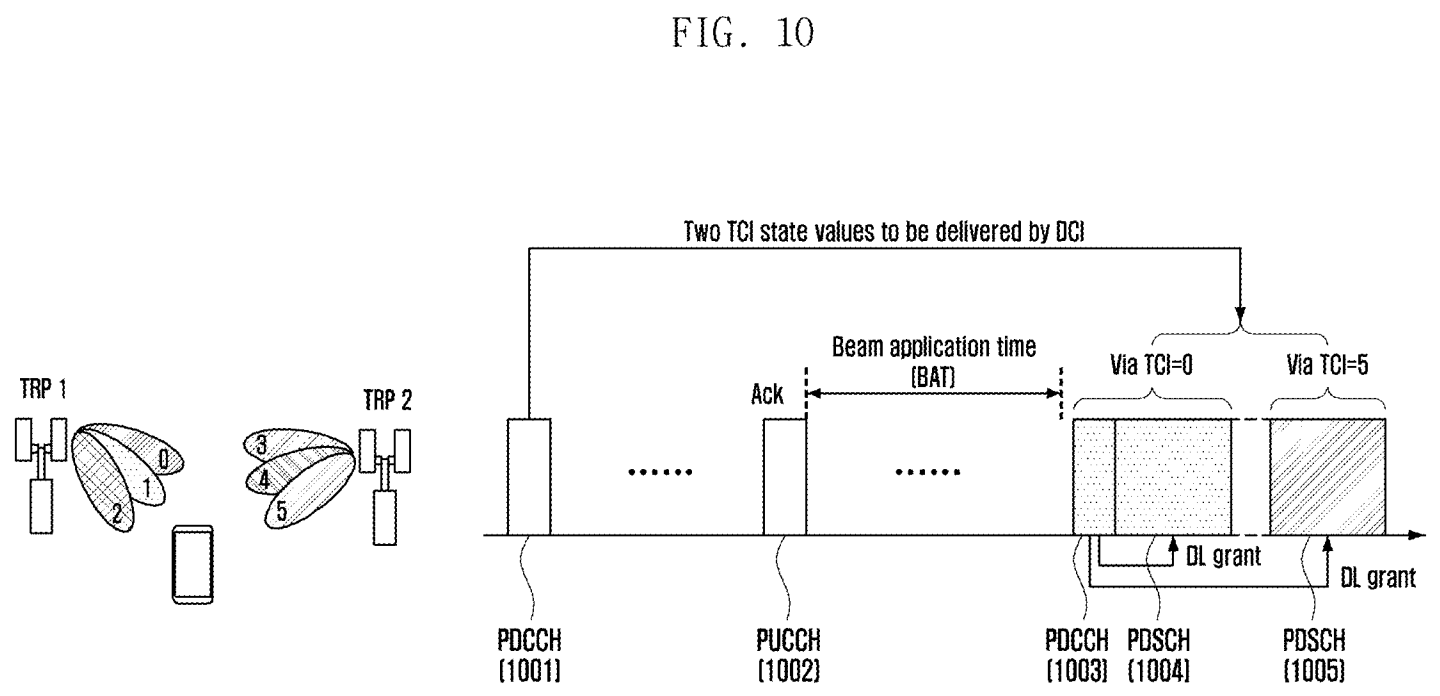

FIG. 10 illustrates when two TCI states are indicated for m-TRP operation according to an embodiment.

Referring to FIG. 10, candidate beams corresponding to three TCI states such as {0, 1, 2} are configured for TRP 1, and candidate beams corresponding to three TCI states such as {3, 4, 5} are configured for TRP 2. However, the disclosure is not limited to the example of FIG. 10.

In FIG. 10, one TRP transmits a PDCCH 1003, so that scheduling for two PDSCHs 1004 and 1005 respectively transmitted in different TRPs may be indicated to a terminal. In this case, the terminal needs to receive TCI state={0} for reception of the PDCCH 1003 and the PDSCH 1004 and TCI state={5} for reception of a remaining PDSCH 1005 in advance via DCI 1001 of a PDCCH and apply the same.

One TRP may transmit, via the PDCCH 1001, control information indicating the TCI state={0} for the PDCCH 1003 and the PDSCH 1004 and TCI state={5} for the remaining PDSCH 1005. The terminal may identify the received control information, update a common TCI state corresponding to TRP 1 with TCI state={0}, update a common TCI state corresponding to TRP 2 with TCI state={5}, and report ACK information indicating the updated common TCI states via the PUCCH 1002. Thereafter (e.g., after a BAT), the terminal and the base station may transmit or receive the PDCCH 1003, the PDSCHs 1004 and 1005, the PUCCH, and/or the PUSCH via new beams (i.e., beams corresponding to the changed common TCI states). For example, the terminal may receive the PDCCH 1003 and the PDSCH 1004 scheduled based on a DL grant of the PDCCH 1003 via a beam corresponding to TCI state={0}. In addition, the terminal may receive the PDSCH 1005 scheduled based on the DL grant of the PDCCH 1003 via a beam corresponding to TCI state={5}.

Figure 11:
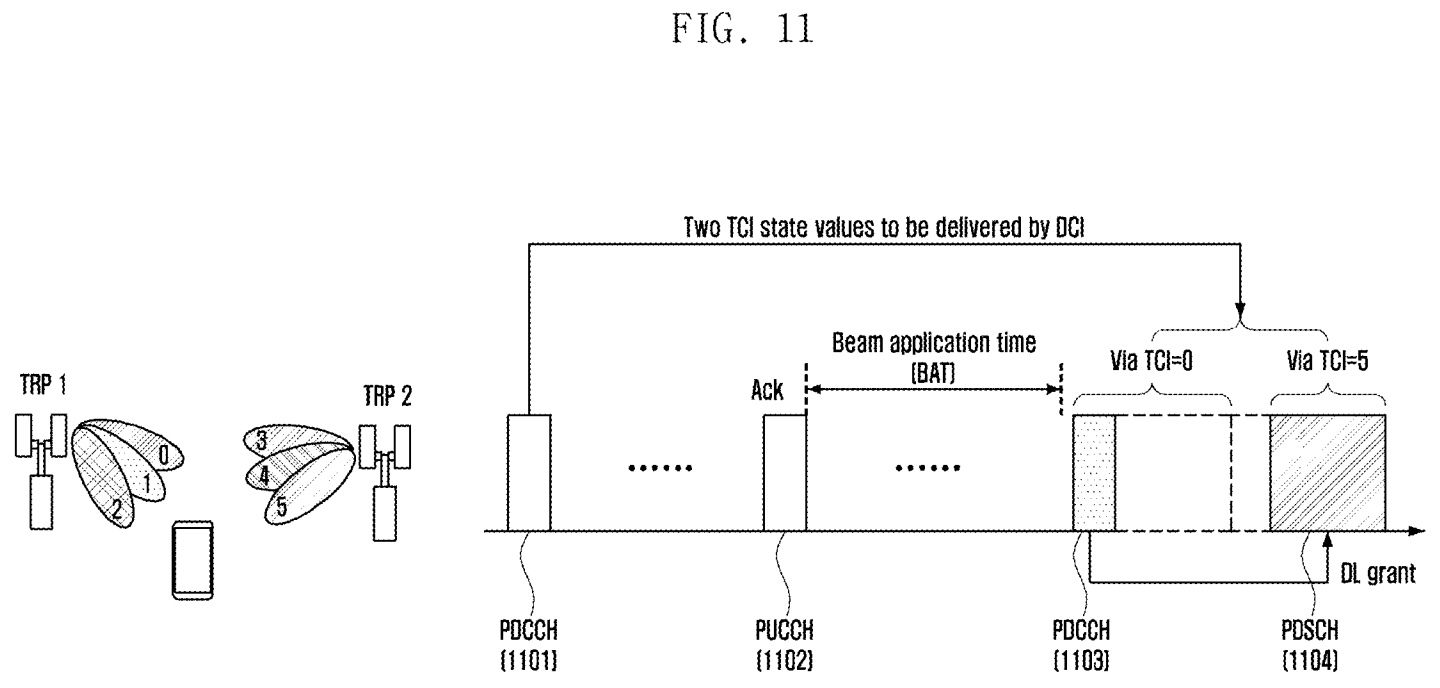

FIG. 11 illustrates when two TCI state values are indicated for m-TRP operation according to an embodiment.

Referring to FIG. 11, candidate beams corresponding to three TCI states such as {0, 1, 2} are configured for TRP 1, and candidate beams corresponding to three TCI states such as {3, 4, 5} are configured for TRP 2. The disclosure is not limited to the example of FIG. 11.

In contrast with FIG. 10, FIG. 11 illustrates that one TRP transmits a PDCCH 1103 so that scheduling of a PDSCH 1104 transmitted from another TRP may be indicated to a terminal. Even in this case, the terminal needs to receive TCI state={0} for reception of the PDCCH 1103 and TCI state={5} for reception of the PDSCH 1104 in advance via DCI 1101 of a PDCCH and apply the same.

One TRP may transmit, via the PDCCH 1101, control information indicating TCI state={0} for the PDCCH 1103 and TCI state={5} for the PDSCH 1104. That is, two TCI state values may be delivered via DCI. The terminal may identify the received control information, update a common TCI state corresponding to TRP 1 with TCI state={0}, update a common TCI state corresponding to TRP 2 with TCI state={5}, and report ACK information indicating the updated common TCI states via the PUCCH 1102. Thereafter (e.g., after a BAT)), the terminal and the base station may transmit or receive the PDCCH 1103, the PDSCH 1104, the PUCCH, and/or the PUSCH via new beams corresponding to the changed common TCI states. For example, the terminal may receive the PDCCH 1103 via a beam corresponding to TCI state={0}. In addition, the terminal may receive the PDSCH 1104 scheduled based on a DL grant of the PDCCH 1103 via a beam corresponding to TCI state={5}.

As described in FIG. 10 and FIG. 11, if the terminal operates in the m-TRP system, the number of TCI states to be indicated to the terminal via DCI by the base station increases, compared to the existing common TCI state-based beam control technique in which beam control is performed via one TCI state value. In other words, there is an increase in the number of TCI state cases, which the base station in the m-TRP system considering one or more TRPs needs to express via DCI.

Figure 12:
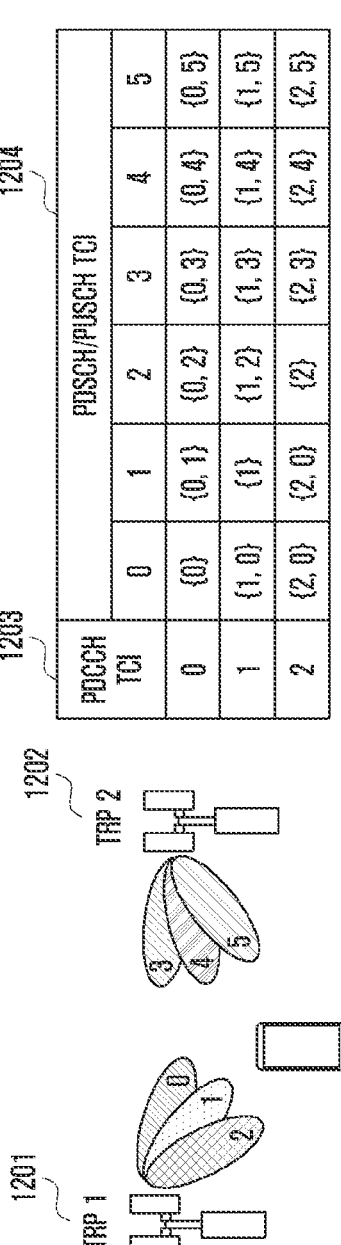
FIG. 12 illustrates a TCI state combination which can be indicated via DCI according to an embodiment.

FIG. 12 illustrates a TCI state combination which can be indicated via DCI according to an embodiment.

Referring to FIG. 12, as in FIGS. 10 and 11 in which candidate beams corresponding to three TCI states such as {0, 1, 2} are configured for TRP 1 1201, and candidate beams corresponding to three TCI states such as {3, 4, 5} are configured for TRP 2 1202.

In an s-DCI mode operation in which TRP 1 1201 transmits a PDCCH 1203 to indicate, to a terminal, PDSCH scheduling of TRP 1 1201 and PDSCH scheduling of TRP 2 1202, thereby controlling transmission or reception of the terminal, in a scenario in which repetition is not considered for PDSCH/PUSCH 1204 transmission or reception and only TRP selection is considered, the number of TCI state selection cases which may be indicated to the terminal by a base station may be 18 in total, as illustrated in FIG. 12. However, since a TCI field indicating a TCI in DCI may have a maximum size of 3 bits, it is difficult to represent all of the above TCI state selection cases.

Figure 13:
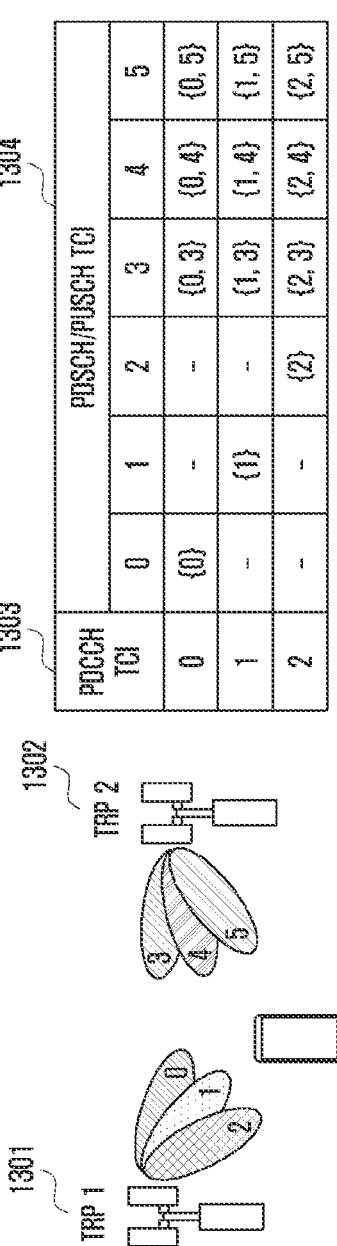
FIG. 13 illustrates a TCI state combination which can be indicated via DCI when one common beam is used for each TRP according to an embodiment.

FIG. 13 illustrates a TCI state combination which can be indicated via DCI when one common beam is used for each TRP according to an embodiment.

In FIG. 13, candidate beams corresponding to three TCI states such as {0, 1, 2} are configured for TRP 1 1301, and candidate beams corresponding to three TCI states such as {3, 4, 5} are configured for TRP 2 1302.

In s-DCI mode operation in which TRP 1 1301 transmits a PDCCH 1303 to indicate, to a terminal, PDSCH scheduling of TRP 1 and PDSCH scheduling of TRP 2, thereby controlling transmission or reception of the terminal, if use of one common beam for each TRP is considered in a scenario without repetition of PDSCH/PUSCH 1304, the number of TCI state selection cases which may be indicated to the terminal by a base station may be 11 in total, as illustrated in FIG. 13. However, it is difficult to represent all of the above TCI state selection cases with a TCI indication field having up to 3 bits. Accordingly, in the m-TRP system, as in a case of having three candidate beams or three active TCI states for each TRP, it is difficult, with the existing DCI format, for the base station to select a TCI state according to the number of cases and indicate the same to the terminal.

If a TCI state configuration for an m-TRP operation is to be supported via a PDCCH without changing the existing DCI format, a method of reducing the number of candidate beams or active TCI states for each TRP is necessary.

FIG. 14 illustrates a candidate beam for each TRP which can be represented via a 3-bit TCI field according to an embodiment.

As described above, without changing the existing DCI format, assigning up to two candidate beams or active TCI states for each TRP, or using one common TCI state for each TRP, the number of TCI state selection cases that may be indicated to a terminal by a base station can be reduced by assigning a total of 5 candidate beams or active TCI states, wherein two of the same are assigned for TRP 1 1401, and 3 of the same are assigned for TRP 2 1402. However, since this method is to reduce the number of cases in which beams can be controlled, an instance may occur in which the base station cannot indicate an appropriate TCI state to the terminal. In particular, considering the number of active TCI states supported by the existing s-TRP system is 8 for each TRP, the above case may substantially limit beam control.

As such, the disclosure provides a method capable of indicating more various candidate beam combinations via DCI by changing contents of a TCI indication field (TCI field) for each CORESET.

Figure 15:
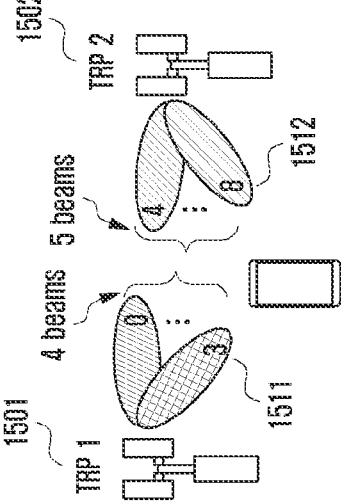
FIG. 15 illustrates a TCI field configuration for each CORESET according to an embodiment.

FIG. 15 illustrates a TCI field configuration for each CORESET according to an embodiment.

Referring to FIG. 15, candidate beams corresponding to four TCI states such as {0, 1, 2, 3} 1511 are configured for TRP 1 1501, and candidate beams corresponding to five TCI states such as {4, 5, 6, 7, 8} 1512 are configured for TRP 2 1502.

When TRP 1 1501 has four active TCI states 1511, and TRP 2 1502 has five active TCI states 1512, if DCI indicates only one TCI state for each TRP, there are a total of 24 TCI state selection cases, as illustrated in FIG. 15. By assigning a different value to each codeword of a TCI indication field for a CORESET, all the above TCI state selection cases may be represented even with a TCI field of a size of up to 3 bits. There may be a mapping relation between a TCI state (or TCI state index) and a value of a TCI field (or TCI indication field), and the mapping relation may be configured for each CORESET (or CORESET index). Alternatively, there may be a mapping relation between a TCI state (or TCI state index) and a value of a TCI field (or TCI indication field), and a TCI state may be acquired from a CORESET (or CORESET index) in which DCI is received, the value of the TCI field, and the mapping relation. A TCI field configuration (or mapping relation) for each CORESET may be performed via RRC signaling. That is, a different value may be assigned to each codeword of a TCI indication field for a CORESET via RRC signaling.

Specifically, referring to the table shown in FIG. 15, if a base station indicates TCI state index=3 to a terminal via DCI, and the DCI is received via CORESET #1 1513, the terminal may understand that TCI state={3} is indicated by the TRP. If the DCI indicating TCI state index=3 is received via CORESET #3 1515, the terminal may understand that TCI state={3, 4} is indicated by the TRP. Even in a general case where a terminal is assigned with multiple TCI states and manages the same, a method of assigning a different value for each codeword of a TCI field for each CORESET may be applied. For example, if the terminal is assigned with multiple TCI states and manages the same regardless of a TRP, such as a first TCI state and a second TCI state, information on the first TCI state and the second TCI state may be mapped to a TCI field codeword value for each CORESET. Considering a TCI field codeword value indicated by a TCI field in DCI and a CORESET in which the DCI is transmitted, the base station or TRP may indicate the first TCI state or the second TCI state to the terminal, and the terminal may update a TCI state to be used. This TCI state indication method may also be applied to common TCI state indication and update.

Figure 16:
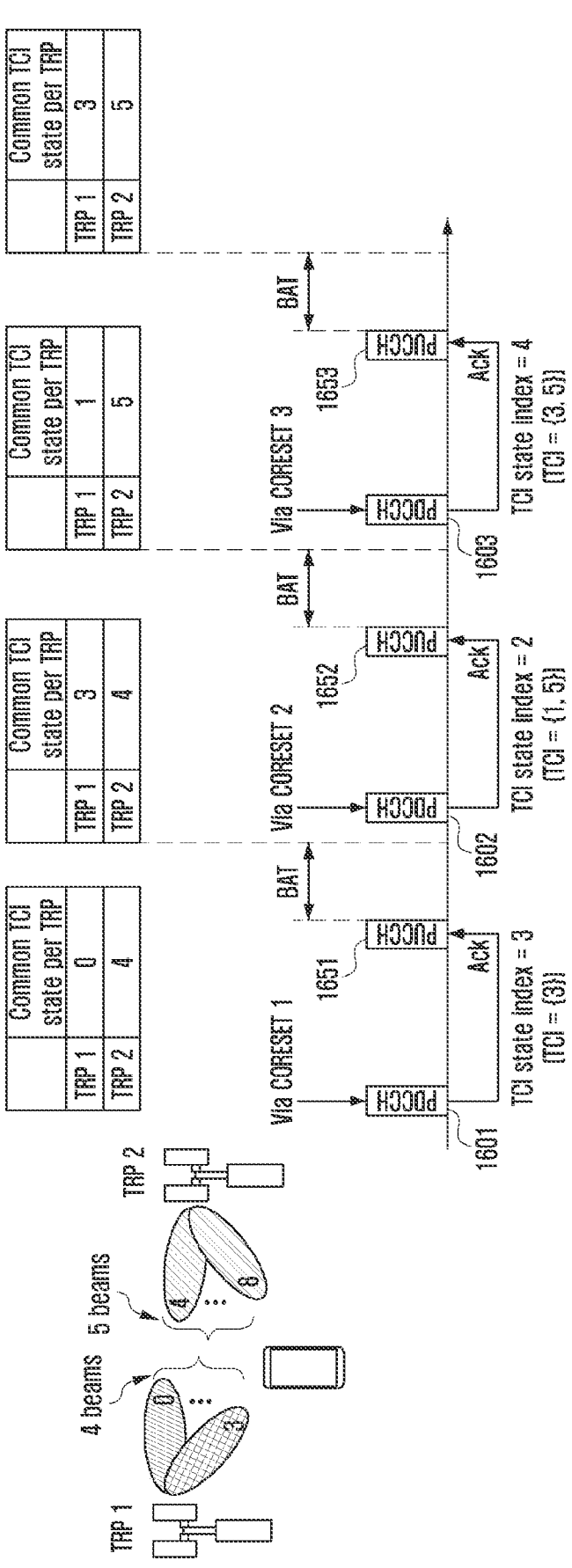
FIG. 16 illustrates indication and update of a common TCI state for each TRP according to an embodiment.

FIG. 16 illustrates indication and update of a common TCI state for each TRP according to an embodiment.

Referring to FIG. 16, candidate beams corresponding to four TCI states such as {0, 1, 2, 3} are configured for TRP 1, candidate beams corresponding to five TCI states such as {4, 5, 6, 7, 8} are configured for TRP 2, and an initial common TCI state={0} of TRP 1 and an initial common TCI state={4} of TRP 2 are configured. The assumption has been made for convenience of description, and it is obvious that the disclosure is not limited to the example of FIG. 16.

If a base station indicates TCI state index=3 to a terminal via DCI 1601 that is received via CORESET #1, the terminal may understand that TCI state={3} is indicated by the TRP, as shown in the table of FIG. 15. Therefore, the terminal may update the common TCI state of TRP 1 with TCI state={3} and may report, to the base station via a PUCCH 1651, ACK information indicating that a transmission/reception beam has been converted to a beam corresponding to TCI state={3}. If the base station indicates TCI state index=2 to the terminal via DCI in the PDCCH 1602 and the DCI is received via CORESET #2, the terminal may understand that TCI state={1, 5} is indicated by the TRP, as shown in the table of FIG. 15. Therefore, the terminal may update the common TCI state of TRP 1 with TCI state={1}, may update the common TCI state of TRP 2 with TCI state={5}, and may report, to the base station via a PUCCH 1652, ACK information indicating that a transmission/reception beam has been converted to a beam corresponding to the indicated TCI state. If the base station indicates TCI state index=4 to the terminal via DCI in the PDCCH 1603 and the DCI is received via CORESET #3, the terminal may understand that TCI state={3, 5} is indicated by the TRP, as shown in the table of FIG. 15. Therefore, the terminal may update the common TCI state of TRP 1 with TCI state={3}, may update the common TCI state of TRP 2 with TCI state={5}, and may report, to the base station via a PUCCH 1653, ACK information indicating that a transmission/reception beam has been converted to a beam corresponding to the indicated TCI state.

In FIG. 16, it is described that a terminal identifies an indicated TCI state value with reference to the table of FIG. 15, but the disclosure is not limited thereto. That is, the disclosure may also be applied to a table having values for each of codewords of TCI fields for each CORESET different from those of the table of FIG. 15.

In addition, the disclosure provides a method of determining, according to a TCI state value indicated by a PDCCH, a reception beam or a TCI state of a PDSCH or a transmission beam or a TCI state of the PUSCH, where the PDSCH or the PUSCH is scheduled by the PDCCH.

The disclosure may be applied to when the terminal is assigned with the first TCI state for TRP 1 and the second TCI state for TRP 2, and manages the same, or when the terminal is assigned with multiple TCI states, which can be distinguished by the terminal, updated via a MAC-CE or DCI, and continuously used until updated again, and manages the multiple TCI states, as the case where the terminal is assigned with the first TCI state and the second TCI state, and manages the same.

In the above cases, if the terminal is indicated to update the TCI state for TRP 1 or the first TCI state via a PDCCH for scheduling of a PDSCH or a PUSCH, the terminal may receive the scheduled PDSCH or transmit the scheduled PUSCH via the TCI state of TRP 1 or the first TCI state. Alternatively, if the terminal is indicated to update the TCI state for TRP 2 or the second TCI state via a PDCCH for scheduling of a PDSCH or a PUSCH, the terminal may receive the scheduled PDSCH or transmit the scheduled PUSCH via the TCI state of TRP 2 or the second TCI state.

Figure 17:
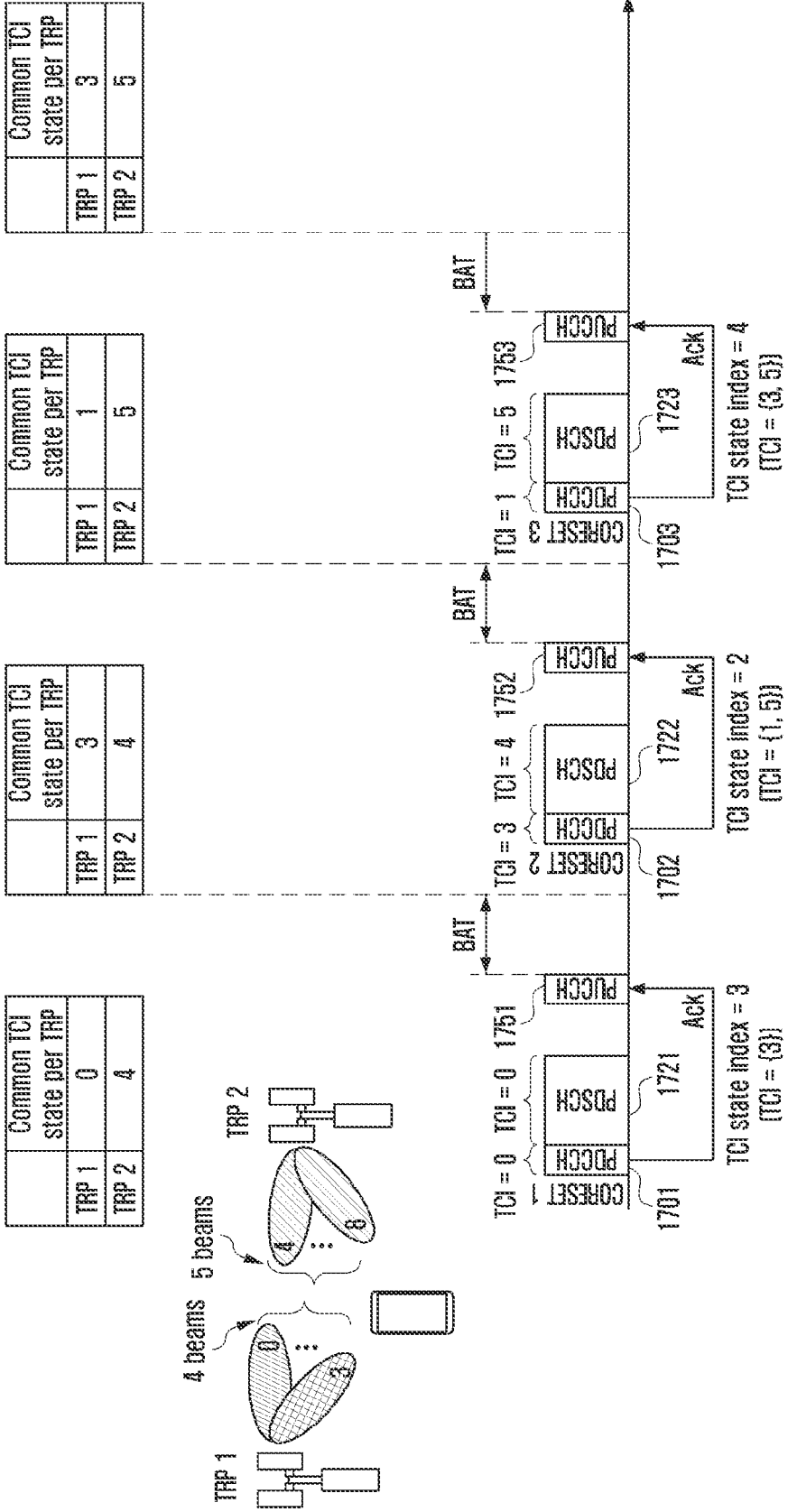
FIG. 17 illustrates indicating an update of a common TCI state for each TRP and PDSCH scheduling according to an embodiment.

FIG. 17 illustrates indicating an update of a common TCI state for each TRP and PDSCH scheduling according to an embodiment.

Referring to FIG. 17, candidate beams corresponding to four TCI states such as {0, 1, 2, 3} are configured for TRP 1, candidate beams corresponding to five TCI states such as {4, 5, 6, 7, 8} are configured for TRP 2, and an initial common TCI state={0} of TRP 1 and an initial common TCI state={4} of TRP 2 are configured. FIG. 17 further considers when PDSCH transmission or reception is performed according to PDCCH scheduling, in addition to the example of FIG. 16. It is assumed that all PDCCH transmissions are performed via TRP 1; however, the disclosure is not limited thereto.

For example, if a base station indicates TCI state index=3 to a terminal via DCI in the PDCCH 1701 and the DCI is received via CORESET #1, the terminal may understand that TCI state={3} is indicated by the TRP, as shown in the table of FIG. 15. That is, since the terminal is indicated to update the common TCI state of TRP 1 to TCI state={3}, the terminal may receive a PDSCH 1721 scheduled by the DCI 1701, via TCI state={0} that is the common TCI state of TRP 1. The terminal may update a value of the common TCI state of TRP 1 with TCI state={3} and may report, to the base station via a PUCCH 1751, ACK information indicating that a transmission/reception beam has been converted to a beam corresponding to TCI state={3}.

If the base station indicates TCI state index=2 to the terminal via DCI in PDCCH 1702 and the DCI is received via CORESET #2, the terminal may understand that TCI state={1, 5} is indicated by the TRP, as shown in the table of FIG. 15. That is, since the terminal is indicated to update the common TCI state of TRP 1 with TCI state={1} and update the common TCI state of TRP 2 with TCI state={5}, respectively, the terminal may receive the PDCCH 1702 via a beam of TCI state={3} that is the common TCI state of TRP 1, but may receive a PDSCH 1722 scheduled by the PDCCH 1702, via TCI state={4} that is the common TCI state of TRP 2. Therefore, the terminal may update the common TCI state of TRP 1 with TCI state={1}, may update the common TCI state of TRP 2 with TCI state={5}, and may report, to the base station via a PUCCH 1752, ACK information indicating that a transmission/reception beam has been converted to a beam corresponding to the indicated TCI state.

If the base station indicates TCI state index=4 to the terminal via DCI in the PDCCH 1703 and the DCI is received via CORESET #3, the terminal may understand that TCI state={3, 5} is indicated by the TRP, as shown in the table of FIG. 15. That is, since the terminal is indicated to update the common TCI state of TRP 1 with TCI state={3} and update the common TCI state of TRP 2 with TCI state={5}, respectively, the terminal may receive the PDCCH 1703 via the common TCI state={1} of TRP 1, and may receive a PDSCH 1723 scheduled by the PDCCH 1703, via the common TCI state={5} of TRP 2. In addition, the terminal may update the common TCI state of TRP 1 with TCI state={3}. In this case, the update may not be performed since the newly indicated TCI state={5} of TRP 2 is the same as the existing TRP 2 TCI state value. The terminal may report, to the base station via a PUCCH 1753, ACK information indicating that a transmission/reception beam has been converted to a beam corresponding to the indicated TCI state.

The disclosure may further provide a method of defining a beam or a TCI state used for transmission or reception of a PDSCH or a PUSCH according to a CORESET to which a PDCCH for scheduling of the PDSCH or the PUSCH is mapped.

For example, if the PDCCH for scheduling of the PDSCH or the PUSCH is received via CORESET 1 or CORESET 2, the terminal may be configured to perform PDSCH reception or PUSCH transmission via the TCI state of TRP 1 or the first TCI state. If the PDCCH is received via CORESET 3, reception of the scheduled PDSCH or transmission of the scheduled PUSCH may be configured to be performed via the TCI state of TRP 2 or the second TCI state.

Figure 18:
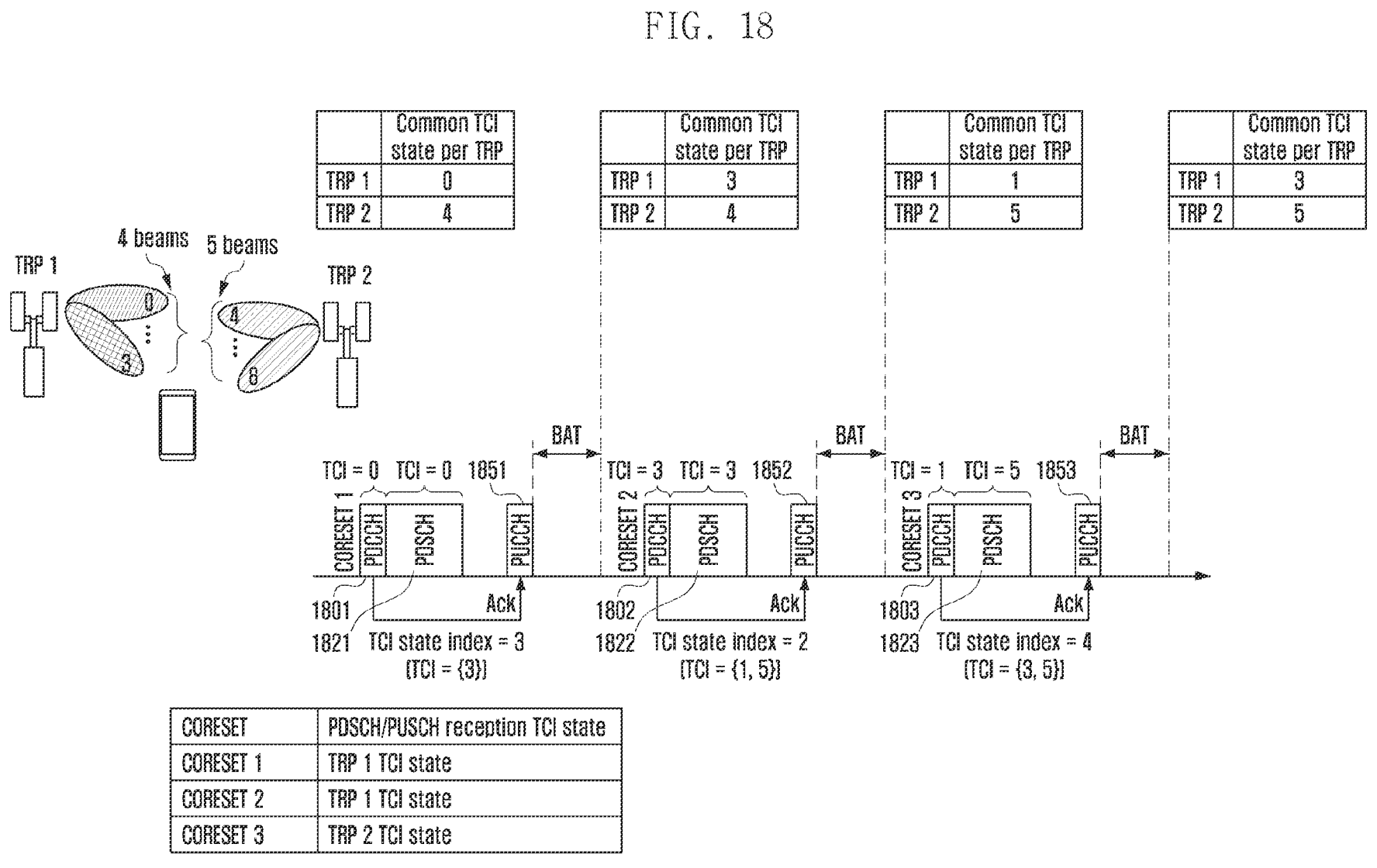

FIG. 18 illustrates indicating an update of a common TCI state for each TRP and PDSCH scheduling according to an embodiment.

Referring to FIG. 18, candidate beams corresponding to four TCI states such as {0, 1, 2, 3} are configured for TRP 1, candidate beams corresponding to five TCI states such as {4, 5, 6, 7, 8} are configured for TRP 2, and an initial common TCI state=0 of TRP 1 and an initial common TCI state={4} of TRP 2 are configured. FIG. 18 further considers when PDSCH transmission or reception is performed according to PDCCH scheduling, in addition to the example of FIG. 16. It is assumed that each PDCCH schedules a PDSCH, and all PDCCH transmissions are performed via TRP 1. It is further assumed that, when a PDCCH is received via CORESET 1 or 2, a TRP 1 TCI state is used for reception of a PDSCH and/or transmission of a PUSCH, where the PDSCH or the PUSCH is scheduled by the PDCCH, and when a PDCCH is received via CORESET 3, a TRP 2 TCI state is used for reception of a PDSCH and/or transmission of a PUSCH, where the PDSCH or the PUSCH is scheduled by the PDCCH. However, the disclosure is not limited thereto.

For example, if a base station indicates TCI state index=3 to a terminal via DCI in PDCCH 1801 and the DCI is received via CORESET #1, the terminal may understand that TCI state={3} is indicated by the TRP, as shown in the table of FIG. 15. If the DCI in PDCCH 1801 is accompanied by PDSCH scheduling, the terminal may receive a PDSCH 1821 scheduled by the DCI via a beam corresponding to the common TCI state={0} of TRP 1. In addition, the terminal may update a value of the common TCI state of TRP 1 with TCI state={3} and may report, to the base station via a PUCCH 1851, ACK information indicating that a transmission/reception beam has been converted to a beam corresponding to TCI state={3}.

If the base station indicates TCI state index=2 to the terminal via DCI in PDCCH 1802 and the DCI is received via CORESET #2, the terminal may understand that TCI state={1, 5} is indicated by the TRP, as shown in the table of FIG. 15. If the DCI 1802 is accompanied by PDSCH scheduling, the terminal may receive a PDSCH 1822 scheduled by the DCI, via a beam corresponding to the common TCI state={3} of TRP 1. Therefore, the terminal may update the common TCI state of TRP 1 with TCI state={1}, may update the common TCI state of TRP 2 with TCI state={5}, and may report, to the base station via a PUCCH 1852, ACK information indicating that a transmission/reception beam has been converted to a beam corresponding to the indicated TCI state.

If the base station indicates TCI state index=4 to the terminal via DCI in PDCCH 1803 and the DCI is received via CORESET #3, the terminal may understand that TCI state={3, 5} is indicated by the TRP, as shown in the table of FIG. 15. If the DCI in PDCCH 1803 is accompanied by PDSCH scheduling, the terminal may receive a PDSCH 1823 scheduled by the DCI via a beam corresponding to the common TCI state={5} of TRP 2. In addition, the terminal may update the common TCI state of TRP 1 with TCI state={3}. In this case, the update may not be performed since the newly indicated TCI state={5} of TRP 2 is the same as the existing TRP 2 TCI state value. The terminal may report, to the base station via a PUCCH 1853, ACK information indicating that a transmission/reception beam has been converted to a beam corresponding to the indicated TCI state.

Figure 19:
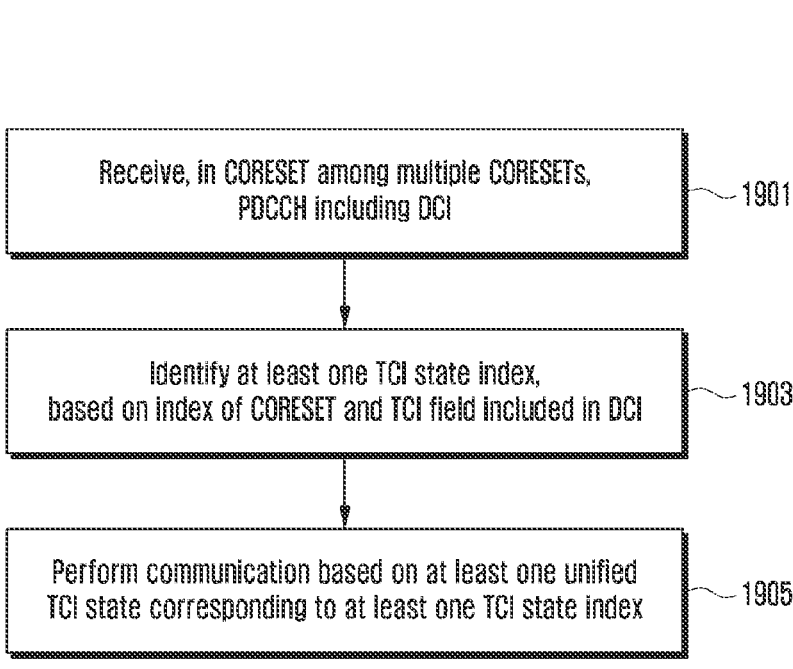
FIG. 19 illustrates an operation method 1900 of a terminal according to an embodiment.

FIG. 19 illustrates an operation method 1900 of a terminal according to an embodiment. The operation method 1900 of the terminal shown in FIG. 19 is for illustrative purposes only, and other embodiments may be used without departing from the scope of the disclosure.

Referring to FIG. 19, in step 1901, a terminal may receive a PDCCH including DCI in a CORESET among multiple CORESETs.

In step 1903, the terminal may identify at least one TCI state index, based on a CORESET index and a TCI field included in the DCI. For example, the terminal may obtain information related to a mapping relation between TCI field values, a CORESET index, and at least one TCI state index. For example, the terminal may identify at least one TCI state index, based on the mapping relation, the CORESET index, and the TCI field value.

In step 1905, the terminal may perform communication based on at least one unified TCI state corresponding to at least one TCI state index. For example, the terminal may perform PDCCH reception, PDSCH reception, PUCCH transmission, PUSCH transmission, or the like, based on at least one unified TCI state.

Figure 20:
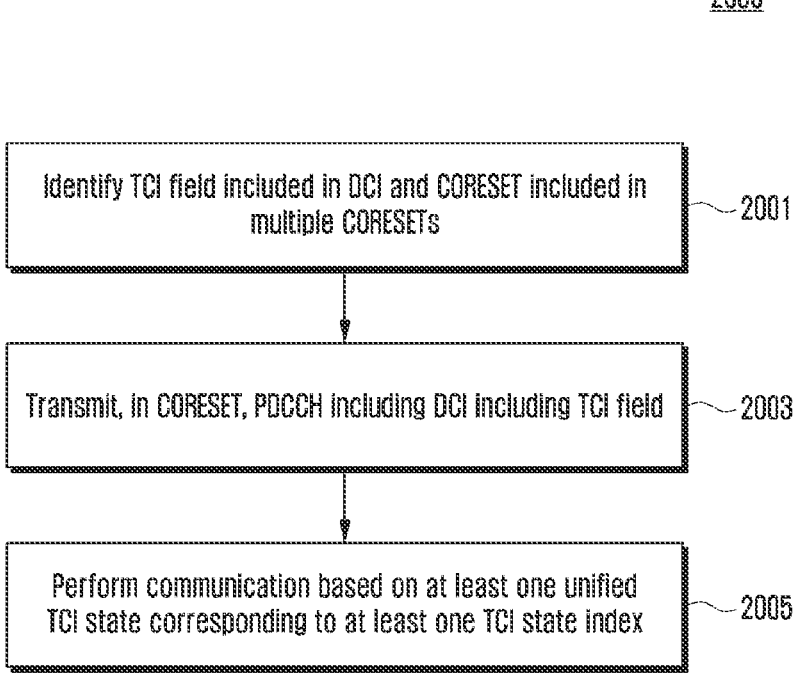
FIG. 20 illustrates an operation method 2000 of a base station according to an embodiment.

FIG. 20 illustrates an operation method 2000 of a base station according to an embodiment. The operation method 2000 of the base station shown in FIG. 20 is for illustrative purposes only, and other embodiments may be used without departing from the scope of the disclosure.

Referring to FIG. 20, in step 2001, the base station may identify a TCI field included in DCI and a CORESET among multiple CORESETs. A TCI field and a CORESET may be related to at least one TCI state index. For example, the base station may acquire information related to a mapping relation between TCI field values for each CORESET and at least one TCI state index. The base station may identify a CORESET index, based on the mapping relation, the TCI field value, and at least one TCI state index.

In step 2003, the base station may transmit a PDCCH including DCI including a TCI field in a CORESET.

In step 2005, the base station may perform communication based on at least one unified TCI state corresponding to at least one TCI state index. For example, the base station may perform PDCCH transmission, PDSCH transmission, PUCCH reception, PUSCH reception, or the like, based on at least one unified TCI state. The above flowcharts illustrate methods that can be implemented in accordance with the principles of the disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Figure 21:
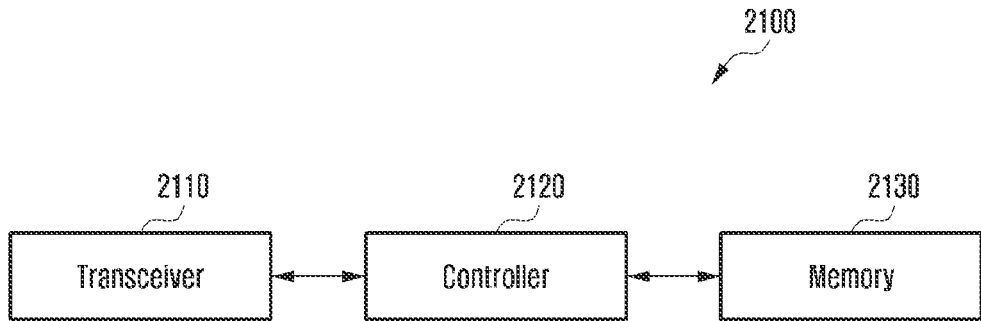
FIG. 21 illustrates a structure of a terminal, to which the disclosure may be applied.

FIG. 21 illustrates a structure of a terminal, to which the disclosure may be applied.

Referring to FIG. 21, a terminal 2100 may include a transceiver 2110, a controller 2120, and a memory 2130. In the disclosure, the controller may be defined as a circuit, an application-specific integrated circuit, or at least one processor.

The transceiver 2110 may transmit a signal to or receive a signal from another network entity, may receive system information from a base station, and may receive a synchronization signal or a reference signal.

The controller 2120 may control overall operations of the terminal 2100 according to an embodiment. For example, the controller 2120 may control the transceiver 2110 or the memory 2130 so as to perform operations according to the aforementioned embodiments. Specifically, the controller 2120 may control the transceiver 2110 to transmit or receive configuration information, control information, or data to or from a base station according to an embodiment.

Figure 22:
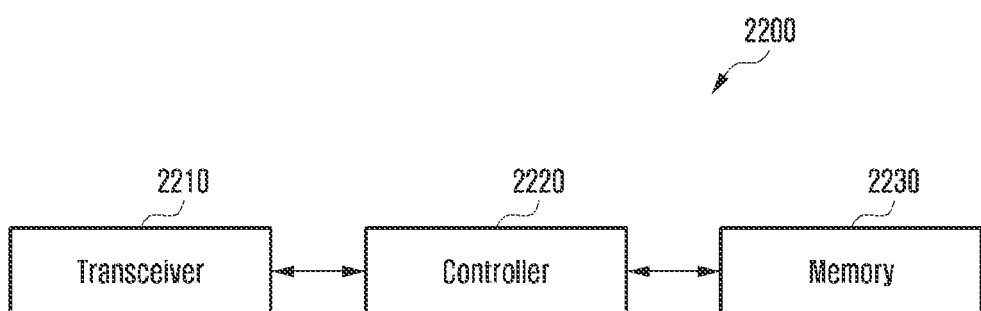
FIG. 22 illustrates a structure of a base station, to which the disclosure may be applied.

The memory 2130 may store at least one of information transmitted or received via the transceiver 2110 and information generated via the controller 2120. FIG. 22 illustrates a structure of a base station, to which the disclosure may be applied.

Referring to FIG. 22, a base station 2200 may include a transceiver 2210, a controller 2220, and a memory 2230. In the disclosure, the controller 2220 may be defined as a circuit, an application-specific integrated circuit, or at least one processor.

The transceiver 2210 may transmit a signal to or receive a signal from another network entity. The transceiver 2210 may transmit system information to a terminal, and may transmit a synchronization signal or a reference signal.

The controller 2220 may control overall operations of the base station 2200 according to an embodiment. For example, the controller 2220 may control the transceiver 2210 or the memory 2230 so as to perform operations according to the aforementioned embodiments. Specifically, the controller 2220 may control the transceiver 2210 to transmit or receive configuration information, control information, or data to or from a terminal according to an embodiment.

The memory 2230 may store at least one of information transmitted or received via the transceiver 2210 and information generated via the controller 2220.

The foregoing describes methods for terminal beam control by a base station in an m-TRP system. The common beam-based beam control technique proposed in the disclosure is applicable to both an s-DCI technique in which one TRP transmits a PDDCH and an m-DCI technique in which multiple TRPs transmit PDCCHs. Accordingly, high-speed beam conversion compared to the existing common beam-based beam control technique can be supported. In particular, the number of all TCI state selection cases increased by considering multiple TRPs can be represented even without increasing a bit width of a TCI field indicating a TCI state within a DCI format, a base station may select and indicate a TCI state more efficiently for use of a beam suitable for a communication environment, thereby reducing PDCCH signaling overhead. In addition, in the disclosed m-TRP system, specific operations of a base station and a terminal are provided in relation to via which beam (e.g., a common beam of a TRP) a PDCCH is received, a PDSCH scheduled by the PDCCH is received, and a PUSCH scheduled by the PDCCH is transmitted, so that a common beam-based beam control technique can be efficiently applied also in the m-TRP system.

Herein, it is understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

It should be noted that the illustrations in FIG. 1 to FIG. 20 of the disclosure are not intended to limit the scope of the disclosure. That is, all components, entities, or operations described in FIG. 1 to FIG. 20 should not be construed as essential components for implementation of the disclosure, and even if only some components are included, the disclosure can be implemented within a range that does not impair the essence of the disclosure.

The above-described operations of a base station or a terminal may be implemented by providing a memory device storing corresponding program codes in a bast station or terminal device. That is, a controller of the base station or terminal device may perform the above-described operations by reading and executing the program codes stored in the memory device by means of a processor or central processing unit (CPU).

Various units or modules of a network entity, a base station device, or a terminal device may be operated using hardware circuits such as complementary metal oxide semiconductor-based logic circuits, firmware, or hardware circuits such as combinations of software and/or hardware and firmware and/or software embedded in a machine-readable medium. For example, various electrical structures and methods may be implemented using transistors, logic gates, and electrical circuits such as application-specific integrated circuits.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method performed by a user equipment (UE) in a communication system, the method comprising:

receiving, via higher layer signaling, a configuration of a plurality of control resource sets (CORESETs), wherein the plurality of CORESETs include first CORESETs associated with a first CORESET pool index and second CORESETs associated with a second CORESET pool index;

receiving, via a medium access control (MAC) control element (CE), mapping information on mapping between values of transmission configuration indication (TCI) state field in a downlink control information (DCI) format and at least one TCI state per each of the plurality of CORESETs;

receiving the DCI format on a CORESET among the plurality of CORESETs;

identifying at least one TCI state based on a value of the TCI state field in the received DCI format, the mapping information and the CORESET on which the received DCI format is received; and performing communication based on at least one unified TCI state, wherein in case that the at least one TCI state is a first TCI state and a second TCI state, the first TCI state and the second TCI state are updated by the TCI state field in the received DCI format from the first TCI state and the second TCI state that are indicated by a TCI state field in an earlier received DCI format, wherein in case that the TCI state is one of the first TCI state and the second TCI state, one of the first TCI state and the second TCI state that is indicated by the TCI state field in the received DCI format is updated and a remaining TCI state that is not indicated by the TCI state field in the received DCI format is unchanged from the first TCI state and the second TCI state that are indicated by the TCI state field in the earlier received DCI format, and wherein each of the first TCI state and the second TCI state is a unified TCI state for downlink and uplink.

2. The method of claim 1, wherein the first TCI state is associated with the first CORESET pool index and the second TCI state is associated with the second CORESET pool index.

3. The method of claim 1, wherein the mapping between the values of TCI state field and at least one TCI state is differently configured for each of the plurality of CORESETs based on the mapping information.

4. The method of claim 1, wherein the mapping information corresponds to a mapping table for the values of TCI state field and the plurality of CORESETs, wherein a number of rows of the mapping table is 8, and wherein a row of the mapping table includes at least one TCI state for the DCI format including the TCI state field received in a first CORESET, at least one TCI state for the DCI format including the TCI state field received in a second CORESET, and at least one TCI state for the DCI format including the TCI state field received in a third CORESET.

5. A user equipment (UE) in a communication system, the UE comprising:

a transceiver; and a processor coupled with the transceiver and configured to:

receive, via higher layer signaling, a configuration of a plurality of control resource sets (CORESETs), wherein the plurality of CORESETs include first CORESETs associated with a first CORESET pool index and second CORESETs associated with a second CORESET pool index;

receive, via a medium access control (MAC) control element (CE), mapping information on mapping between values of transmission configuration indication (TCI) state field in a downlink control information (DCI) format and at least one TCI state per each of the plurality of CORESETs;

receive the DCI format on a CORESET among the plurality of CORESETs;

identify at least one TCI state based on a value of the TCI state field in the received DCI format, the mapping information and the CORESET on which the received DCI format is received; and perform communication based on at least one unified TCI state, wherein in case that the at least one TCI state is a first TCI state and a second TCI state, the first TCI state and the second TCI state are updated by the TCI state field in the received DCI format from the first TCI state and the second TCI state that are indicated by a TCI state field in an earlier received DCI format, wherein in case that the TCI state is one of the first TCI state and the second TCI state, one of the first TCI state and the second TCI state that is indicated by the TCI state field in the received DCI format is updated and a remaining TCI state that is not indicated by the TCI state field in the received DCI format is unchanged from the first TCI state and the second TCI state that are indicated by the TCI state field in the earlier received DCI format, and wherein each of the first TCI state and the second TCI state is a unified TCI state for downlink and uplink.

6. The UE of claim 5, wherein the first TCI state is associated with the first CORESET pool index and the second TCI state is associated with the second CORESET pool index.

7. The UE of claim 5, wherein the mapping between the values of TCI state field and at least one TCI state is differently configured for each of the plurality of CORESETs based on the mapping information.

8. The UE of claim 5, wherein the mapping information corresponds to a mapping table for the values of TCI state field and the plurality of CORESETs, wherein a number of rows of the mapping table is 8, and wherein a row of the mapping table includes at least one TCI state for the DCI format including the TCI state field received in a first CORESET, at least one TCI state for the DCI format including the TCI state field received in a second CORESET, and at least one TCI state for the DCI format including the TCI state field received in a third CORESET.

9. A method performed by a base station in a communication system, the method comprising:

transmitting, to a user equipment (UE) via higher layer signaling, a configuration of a plurality of control resource sets (CORESETs), wherein the plurality of CORESETs include first CORESETs associated with a first CORESET pool index and second CORESETs associated with a second CORESET pool index;

transmitting, to the UE via a medium access control (MAC) control element (CE), mapping information on mapping between values of transmission configuration indication (TCI) state field in a downlink control information (DCI) format and at least one TCI state per each of the plurality of CORESETs;

transmitting, to the UE, the DCI format on a CORESET among the plurality of CORESETs; and performing communication with the UE based on at least one TCI state, wherein the at least one TCI state is indicated based on a value of the TCI state field in the transmitted DCI format, the mapping information and the CORESET on which the transmitted DCI format is transmitted, wherein in case that the at least one TCI state is a first TCI state and a second TCI state, the first TCI state and the second TCI state are updated by the TCI state field in the transmitted DCI format from the first TCI state and the second TCI state that are indicated by a TCI state field in an earlier transmitted DCI format, wherein in case that the TCI state is one of the first TCI state and the second TCI state, one of the first TCI state and the second TCI state that is indicated by the TCI state field in the transmitted DCI format is updated and a remaining TCI state that is not indicated by the TCI state field in the transmitted DCI format is unchanged from the first TCI state and the second TCI state that are indicated by the TCI state field in the earlier transmitted DCI format, and wherein each of the first TCI state and the second TCI state is a unified TCI state for downlink and uplink.

10. The method of claim 9, wherein the first TCI state is associated with the first CORESET pool index and the second TCI state is associated with the second CORESET pool index.

11. The method of claim 9, wherein the mapping between the values of TCI state field and at least one TCI state is differently configured for each of the plurality of CORESETs based on the mapping information.

12. The method of claim 9, wherein the mapping information corresponds to a mapping table for the values of TCI state field and the plurality of CORESETs, wherein a number of rows of the mapping table is 8, and wherein a row of the mapping table includes at least one TCI state for the DCI format including the TCI state field transmitted in a first CORESET, at least one TCI state for the DCI format including the TCI state field transmitted in a second CORESET, and at least one TCI state for the DCI format including the TCI state field transmitted in a third CORESET.

13. A base station in a communication system, the base station comprising:

a transceiver; and a processor coupled with the transceiver and configured to:

transmit, to a user equipment (UE) via higher layer signaling, a configuration of a plurality of control resource sets (CORESETs), wherein the plurality of CORESETs include first CORESETs associated with a first CORESET pool index and second CORESETs associated with a second CORESET pool index;

transmit, to the UE via a medium access control (MAC) control element (CE), mapping information on mapping between values of transmission configuration indication (TCI) state field in a downlink control information (DCI) format and at least one TCI state per each of the plurality of CORESETs;

transmit, to the UE, the DCI format on a CORESET among the plurality of CORESETs; and perform communication with the UE based on at least one TCI state, wherein the at least one TCI state is indicated based on a value of the TCI state field in the transmitted DCI format, the mapping information and the CORESET on which the transmitted DCI format is transmitted, wherein in case that the at least one TCI state is a first TCI state and a second TCI state, the first TCI state and the second TCI state are updated by the TCI state field in the transmitted DCI format from the first TCI state and the second TCI state that are indicated by a TCI state field in an earlier transmitted DCI format, wherein in case that the TCI state is one of the first TCI state and the second TCI state, one of the first TCI state and the second TCI state that is indicated by the TCI state field in the transmitted DCI format is updated and a remaining TCI state that is not indicated by the TCI state field in the transmitted DCI format is unchanged from the first TCI state and the second TCI state that are indicated by the TCI state field in the earlier transmitted DCI format, and wherein each of the first TCI state and the second TCI state is a unified TCI state for downlink and uplink.

14. The base station of claim 13, wherein the first TCI state is associated with the first CORESET pool index and the second TCI state is associated with the second CORESET pool index.

15. The base station of claim 13, wherein the mapping between the values of TCI state field and at least one TCI state is differently configured for each of the plurality of CORESETs based on the mapping information.

16. The base station of claim 13, wherein the mapping information corresponds to a mapping table for the values of TCI state field and the plurality of CORESETs, wherein a number of rows of the mapping table is 8, and wherein a row of the mapping table includes at least one TCI state for the DCI format including the TCI state field transmitted in a first CORESET, at least one TCI state for the DCI format including the TCI state field transmitted in a second CORESET, and at least one TCI state for the DCI format including the TCI state field transmitted in a third CORESET.

\* \* \* \* \*